US010220518B2

(12) United States Patent
Jackowski et al.

(10) Patent No.: US 10,220,518 B2
(45) Date of Patent: *Mar. 5, 2019

(54) TOUCH-DOWN SENSING FOR ROBOTIC DEVICES

(71) Applicant: Boston Dynamics, Inc., Waltham, MA (US)

(72) Inventors: Zachary Jackowski, Somerville, MA (US); Kevin Blankespoor, Mountain View, CA (US); John Aaron Saunders, Arlington, MA (US); Francis M. Agresti, Mountain View, CA (US)

(73) Assignee: Boston Dynamics, Inc., Waltham, MA (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/296,094

(22) Filed: Oct. 18, 2016

(65) Prior Publication Data
US 2017/0036352 A1  Feb. 9, 2017

Related U.S. Application Data

(63) Continuation of application No. 14/605,616, filed on Jan. 26, 2015, now Pat. No. 9,499,219.
(Continued)

(51) Int. Cl.
*B25J 13/08*  (2006.01)
*B25J 9/16*  (2006.01)
*B62D 57/032*  (2006.01)

(52) U.S. Cl.
CPC ........... *B25J 13/085* (2013.01); *B25J 9/1694* (2013.01); *B62D 57/032* (2013.01); *Y10S 901/01* (2013.01); *Y10S 901/10* (2013.01)

(58) Field of Classification Search
CPC ...... B62D 57/032; B62D 57/02; B25J 9/1694; B25J 9/0006; B25J 9/1653; B25J 9/1697;
(Continued)

(56) References Cited

U.S. PATENT DOCUMENTS 5,255,753 A * 10/1993 Nishikawa ............. B62D 57/02
                                                                180/8.1
6,177,776 B1   1/2001 Kawai
(Continued)

OTHER PUBLICATIONS

Kong and Tomizuka, A Gait Monitoring System Based on Air Pressure Sensors Embedded in a Shoe, Journal, Jun. 3, 2009, pp. 1-13, vol. 14, Issue 3.

*Primary Examiner* — Bao Long T Nguyen
(74) *Attorney, Agent, or Firm* — Honigman LLP

(57) ABSTRACT

Example methods and devices for touch-down detection for a robotic device are described herein. In an example embodiment, a computing system may receive a force signal due to a force experienced at a limb of a robotic device. The system may receive an output signal from a sensor of the end component of the limb. Responsive to the received signals, the system may determine whether the force signal satisfies a first threshold and determine whether the output signal satisfies a second threshold. Based on at least one of the force signal satisfying the first threshold or the output signal satisfying the second threshold, the system of the robotic device may provide a touch-down output indicating touch-down of the end component of the limb with a portion of an environment.

20 Claims, 15 Drawing Sheets

Related U.S. Application Data

(60) Provisional application No. 62/041,431, filed on Aug. 25, 2014.

(58) Field of Classification Search
CPC ..... B25J 13/08–13/081; B25J 13/084–13/085; B25J 13/087; B25J 19/02; Y10S 901/01; Y10S 901/10; Y10S 901/46–901/47; Y10S 901/50
USPC ........ 700/250, 258, 259, 253; 901/1, 10, 46, 901/47, 50; 318/568.12, 568.16, 568.24; 702/38
See application file for complete search history.

(56) References Cited

U.S. PATENT DOCUMENTS

| | | | |
|---|---|---|---|
| 7,228,923 B2 | 6/2007 | Takenaka et al. | |
| 7,378,811 B2 | 5/2008 | Takenaka et al. | |
| 7,426,873 B1 | 9/2008 | Kholwadwala et al. | |
| 7,664,572 B2 | 2/2010 | Takenaka et al. | |
| 8,500,823 B2 * | 8/2013 | Herr | A61F 2/64 623/24 |
| 2004/0060746 A1 | 4/2004 | Furuta et al. | |
| 2004/0181312 A1 * | 9/2004 | Miura | B25J 13/085 700/258 |
| 2005/0228539 A1 | 10/2005 | Takenaka et al. | |
| 2005/0228540 A1 * | 10/2005 | Moridaira | A63H 11/00 700/245 |
| 2005/0240308 A1 | 10/2005 | Kaneko et al. | |
| 2006/0173578 A1 | 8/2006 | Takenaka et al. | |
| 2006/0197485 A1 * | 9/2006 | Kawai | B62D 57/032 318/568.12 |
| 2006/0200272 A1 | 9/2006 | Kawai | |
| 2008/0185985 A1 | 8/2008 | Miyazaki | |
| 2008/0208391 A1 | 8/2008 | Hasegawa et al. | |
| 2009/0099689 A1 * | 4/2009 | Takenaka | B62D 57/032 700/245 |
| 2009/0210093 A1 | 8/2009 | Jacobsen et al. | |
| 2011/0231017 A1 * | 9/2011 | Takeda | B62D 57/032 700/250 |
| 2011/0231050 A1 | 9/2011 | Goulding | |
| 2012/0136458 A1 | 5/2012 | Martin | |
| 2012/0197435 A1 * | 8/2012 | Maisonnier | B62D 57/032 700/245 |
| 2012/0316682 A1 * | 12/2012 | Seo | B62D 57/032 700/261 |
| 2012/0316683 A1 | 12/2012 | Seo et al. | |
| 2013/0144437 A1 | 6/2013 | Lee et al. | |
| 2013/0158712 A1 | 6/2013 | Lee et al. | |
| 2013/0218345 A1 * | 8/2013 | Lee | B25J 9/162 700/261 |
| 2013/0231822 A1 | 9/2013 | Gouaillier | |
| 2014/0172168 A1 | 6/2014 | Lee et al. | |
| 2014/0188280 A1 | 7/2014 | Lee et al. | |
| 2015/0120044 A1 * | 4/2015 | Cory | B62D 57/032 700/250 |
| 2015/0158175 A1 | 6/2015 | Kim et al. | |
| 2015/0196403 A1 * | 7/2015 | Kim | A61F 2/70 623/24 |
| 2015/0197008 A1 | 7/2015 | Yoon et al. | |
| 2015/0343633 A1 | 12/2015 | Gouaillier et al. | |
| 2016/0023354 A1 | 1/2016 | Perkins et al. | |
| 2016/0023647 A1 | 1/2016 | Saunders et al. | |

\* cited by examiner

TOUCH-DOWN SENSING FOR ROBOTIC DEVICES

CROSS-REFERENCE TO RELATED APPLICATION

This application is a continuation of U.S. patent application Ser. No. 14/605,616, filed on Jan. 26, 2015, which claims priority to U.S. Provisional Patent Application Ser. No. 62/041,431, filed on Aug. 25, 2014, the entirety of each of which is herein incorporated by reference.

BACKGROUND

Unless otherwise indicated herein, the materials described in this section are not prior art to the claims in this application and are not admitted to be prior art by inclusion in this section.

Robotic devices may be used for applications involving material handling, transportation, welding, assembly, and dispensing, among others. Over time, the manner in which these robotic systems operate is becoming more intelligent, efficient, and more intuitive. As robotic devices become increasingly prevalent in numerous aspects of modern life, the need for a robotic device to interact with the world intelligently becomes apparent. Therefore, a demand for efficient robotic devices has helped open up a field of innovation in actuators, movement, sensing techniques, as well as component design and assembly. Robotic devices are being expected to move and operate efficiently to perform new tasks and functions.

SUMMARY

In one example, the present application describes a method. The method may comprise receiving, at a computing system of a robotic device, a force signal due to a force experienced at a limb of the robotic device. The force experienced may be due to an end component of the limb contacting an element in an environment. The method may also include, receiving, at the computing system of a robotic device, an output signal from a sensor of the end component of the limb. The sensor is provided at a sole of the end component. The output signal is based on a detected pressure at the sole. The method may also include, determining, at the computing system of the robotic device, an operational state of the limb of the robotic device. The method may also include, modifying, at the computing system of the robotic device, the force signal based on the operational state of the limb of the robotic device. The method may also include, determining whether the modified force signal satisfies a first threshold and determining whether the output signal satisfies a second threshold. The second threshold is lower than the first threshold. The method may also include, based on at least one of the modified force signal satisfying the first threshold or the output signal satisfying the second threshold, providing by the computing system of the robotic device, a touch-down output indicating touch-down of the end component of the limb with a portion of the environment.

In another example, the present application describes another method. The method may comprise determining, at a computing system of a robotic device, an end component force signal based on a force provided by an actuator of the robotic device and applied to a limb of the robotic device. The method may also include, receiving, at the computing system of the robotic device, an output signal from a pressure sensor provided on a limb of the robotic device. The pressure sensor is coupled to a tube comprising a fluid. The output signal may correspond to a force applied to the tube due to an end component of the limb contacting an element in an environment. The tube is provided on a sole of the end component of the limb of the robotic device. The method may also include, determining, at the computing system of the robotic device, a relative position of the first member to the second member at the joint of the robotic device. The method may also include, modifying, at the computing system of the robotic device, the end component force signal according to the relative position of the first member to the second member at the joint of the robotic device. The method may also include, providing, at the computing system of the robotic device, a combined force signal based on a combination of the modified end component force signal and the output signal. The method may also include, determining, at the computing system of the robotic device, whether the combined force signal satisfies a threshold. The method may also include, based on the combined force signal satisfying the threshold, providing by the computing system of the robotic device, a touch-down output indicating touch-down of the end component of the limb with a portion of the environment.

In another example, the present application describes a robotic device. The robotic device may comprise one or more limbs having a respective end component. The one or more limbs may be operated to move the robotic device and cause contact of the respective end component with one or more elements of an environment. The robotic device may also comprise a bladder provided at a sole of the respective end component. The bladder may include air or liquid. The robotic device may also comprise a first sensor coupled to the bladder and configured for determining a pressure of the air or liquid in the sensor. The robotic device may also comprise a second sensor coupled to the one or more limbs for determining a position associated with a gait of the robotic device. The robotic device may also comprise a touch-down sensor coupled to the respective end component for determining a force applied on the respective end component. The robotic device may also comprise one or more processors configured for receiving an output of the sensor and an output of the touch-down sensor. Based on the received outputs, the one or more processors may be configured for determining contact with the one or more elements of the environment.

In another example, a system is provided that includes a means for receiving a force signal due to a force experienced at a limb of the robotic device due to an end component of the limb contacting an element in an environment, and a means for receiving an output signal from a sensor of the end component of the limb. The sensor is provided at a sole of the end component. The output signal is based on a detected pressure at the sole. The system also includes means for determining an operational state of the limb of the robotic device. The system also includes means for modifying the force signal based on the operational state of the limb of the robotic device. The system also includes a means for determining whether the modified force signal satisfies a first threshold, and a means for determining whether the output signal satisfies a second threshold. The second threshold is lower than the first threshold. The system also includes, based on at least one of the modified force signal satisfying the first threshold or the output signal satisfying the second threshold, a means for providing by the computing system of the robotic device, a touch-down output indicating touch-down of the end component of the limb with a portion of the environment.

These as well as other aspects, advantages, and alternatives, will become apparent to those of ordinary skill in the art by reading the following detailed description, with reference where appropriate to the accompanying figures.

DETAILED DESCRIPTION

Figure 1:
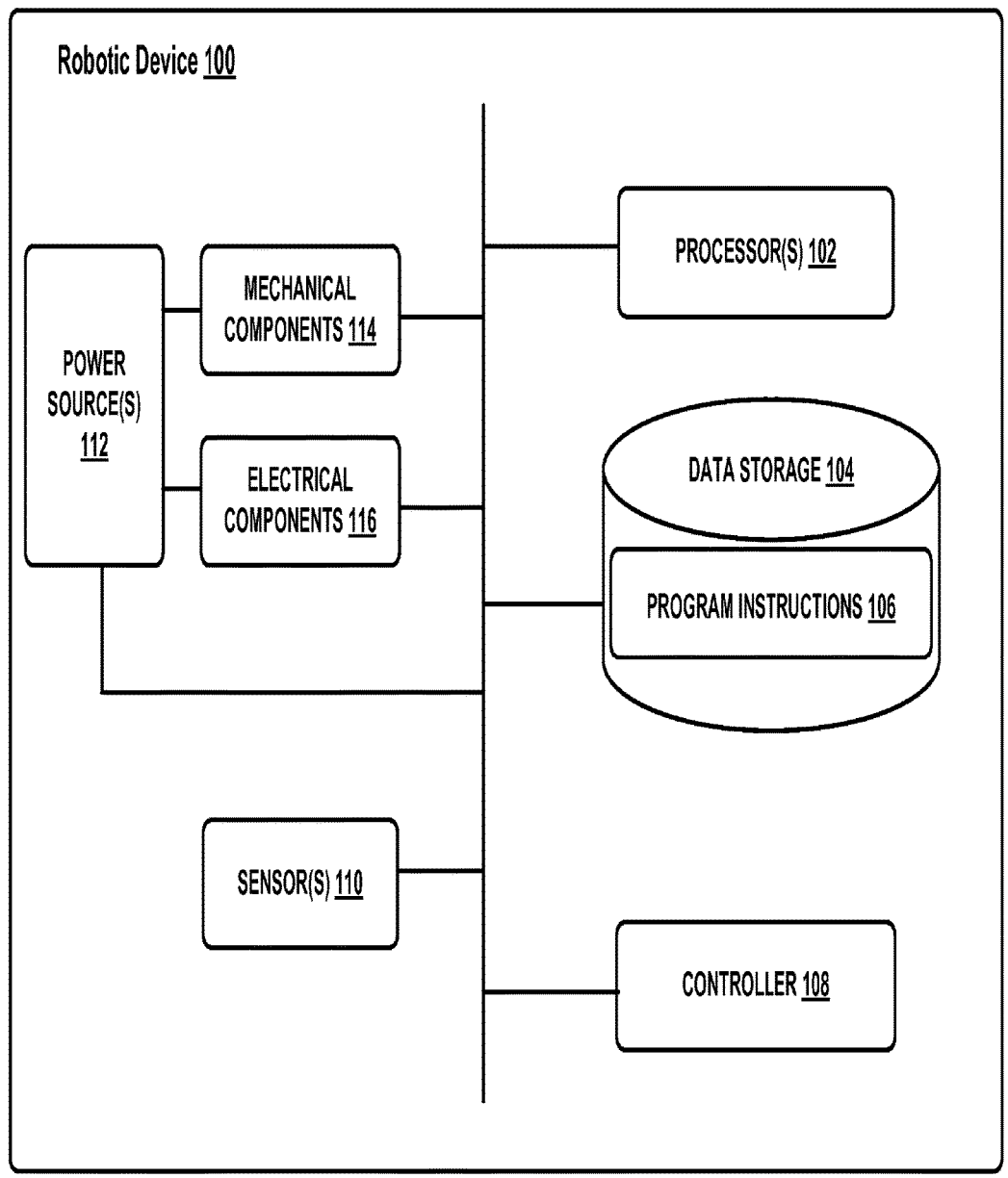
FIG. 1 illustrates an example configuration of a robotic device.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples described herein include subsystems that enable a legged robotic device to determine a touch-down event. In one example, a method is described that includes receiving, at a computing system of a robotic device, a force signal due to a force experienced at a limb of the robotic device due to an end component of the limb contacting an element in an environment, and receiving an output signal from a sensor of the end component of the limb. The method includes determining an operational state of the limb of the robotic device and modifying the force signal based on the operational state of the limb. The method also includes determining whether the modified force signal satisfies a first threshold, and determining whether the output signal satisfies a second threshold that is lower than the first threshold. Based on at least one of the modified force signal satisfying the first threshold or the output signal satisfying the second threshold, the computing system of the robotic device provides a touch-down output indicating touch-down of the end component of the limb with a portion of the environment.

By way of example, the robotic device may be configured so that the robotic device can traverse through a variety of environments. For instance, the robotic device may be required to provide assistance in a facility that requires navigation of multiple floors and accessing the multiple floors by way of stairs or overcoming obstacles. In this instance, the robotic device may need to detect a touch-down as soon as possible in order to conserve energy and provide a fast response to an assigned task. It would be helpful for the robotic device to prevent from falling over or causing unintended damage due to a false detection of a touch-down event. Therefore, the robotic device may be configured to enable sensors coupled to the robotic device to provide a certain confidence regarding whether touch-down of a limb associated with the robotic device has occurred.

In one example, the robotic device may be capable of detecting a force signal at an actuator of a limb of the robotic device. One way to accomplish detection of a force signal may be achieved through the capabilities of a cylindrical load cell. The cylindrical load cell may be coupled to the actuator and configured to determine an axial force that is present on the respective end component that is coupled to the actuator. There are a variety of cylindrical load cells with various accuracy measurements and detection capabilities that could be implemented.

By way of example, the robotic device may also accomplish detection of a force signal through the use of a pressure sensor in a hydraulic actuator. A measured pressure in the hydraulic actuator by the pressure sensor may be used in combination with a known piston area in order to determine a force experienced at an actuator. Depending on application, if an electric actuator is used in place of a hydraulic actuator, it may be possible to determine the force experienced at the actuator by measuring the current provided to the electric actuator in order to determine a torque associated with the electric actuator.

In another example, the robotic device may include a number of sensors that are configured to also determine a touch-down event. An example sensor may be a pneumatic sensor that is coupled to a tube. By way of example, the tube may comprise a fluid comprising a pressure that is susceptible to changes as the robotic device comes into contact with an element of an environment. This may enable an increase in pressure, and therefore cause the pneumatic sensor to provide an output signal to a computing system of the robotic device.

By way of example operation, the computing system of the robotic device may be configured to receive the force signal and compare the force signal to a first threshold. The first threshold may be determined based on any number of factors. In one example, one factor of the number of factors may be a distance between the end component of the robotic device and ground. The distance may serve as a factor to prevent the force signal from triggering a false touch-down event due to the end component having come into contact with an unexpected element of the environment.

Further, in another instance, the computing system of the robotic device may be configured to receive the output signal of the pneumatic sensor. In this example, the computing system of the robotic device may be configured to compare the output signal against a second threshold. The second threshold may also be determined on any number of factors. By way of example, the second threshold may be set to a lower threshold than the first threshold in order to ensure that the end component has experienced a touch-down event with the environment. A lowered threshold may enable the computing system to analyze the difference in detection between a force experienced at one location of the end component and another location of the end component.

By way of example, the computing system of the robotic device may be capable of providing an indication of a touch-down event once multiple signals have been received and processed according to various thresholds. This fast detection of a touch-down event may serve to improve overall performance of the robotic device.

Referring now to the figures, FIG. 1 illustrates an example configuration of a robotic device 100. The robotic device 100 represents an example robotic device configured to perform the methods described therein. In addition, the robotic device 100 may be configured to operate autonomously, semi-autonomously, and/or using instructions provided user(s), and may exist in various forms, such as a humanoid robot, a biped robot or a quadruped robot, among other examples. Furthermore, the robotic device 100 may also be referred to as a robotic device, mobile robot, or robot, among others.

As shown in FIG. 1, the robotic device 100 includes processor(s) 102, data storage 104, program instructions 106, controller 108, power source(s) 112, mechanical components 114, and electrical components 116. The robotic device 100 is shown for illustration purposes as a robotic device 100 may include more or less components within examples. The various components of robotic device 100 may be connected in any manner, including wired or wireless connections. Further, in some examples, components of the robotic device 100 may be positioned on multiple entities rather on a single entity. Other example illustrations of robotic device 100 may exist as well.

Additionally, the robotic device 100 includes one or more sensor(s) 110 such as force sensor, pneumatic sensors, load sensors, touch sensors, depth sensors, ultrasonic range sensor, and infrared sensors, among other possibilities. The sensor(s) 110 may provide sensor data to the processor(s) 102 to allow for appropriate interaction of the robotic device 100 with the environment as well as monitoring of operation of the systems of the robotic device 100. The sensor data may be used in evaluation of various factors for detection of a touch-down event as well as activation and deactivation of mechanical components 114 and electrical components 116 by controller 108 and/or a computing system of the robotic device 100.

The sensor(s) 110 may provide information indicative of the environment of the robotic device for the controller 108 and/or computing system to use to determine operations for the robotic device 100. For example, the sensor(s) 110 may capture data corresponding to the terrain of the environment or location of nearby objects, which may assist with environment recognition and navigation, etc. In one example configuration, the robotic device 100 may include a sensor system that includes RADAR, LIDAR, a global positioning system (GPS), and/or other sensors for capturing information of the environment of the robotic device 100. The sensor(s) 110 may monitor the environment in real-time and detect obstacles, elements of the terrain, weather conditions, temperature, and/or other parameters of the environment for the robotic device 100.

Further, the robotic device 100 may include other sensor(s) 110 configured to receive information indicative of the state of the robotic device 100, including sensor(s) 110 that may monitor the state of the various components of the robotic device 100. The sensor(s) 110 may measure activity of systems of the robotic device 100 and receive information based on the operation of the various features of the robotic device 100, such the operation of extendable legs, arms, or other mechanical and/or electrical features of the robotic device 100. The sensor data provided by the sensors may enable the computing system of the robotic device 100 to determine errors in operation as well as monitor overall functioning of components of the robotic device 100. For example, the computing system may use sensor data to determine a stability of the robotic device 100 during operations as well as measurements related to power levels, communication activities, components that require repair, among other information. As one example configuration, the robotic device 100 may include gyroscope(s), accelerometer(s), and/or other possible sensors to provide sensor data relating to the state of operation of the robotic device. Further, sensor(s) 110 may also monitor the current state of a function, such as a gait, that the robotic device 100 may currently be operating. Other example uses for the sensor(s) 110 may exist as well.

Additionally, the robotic device 100 may also include one or more power source(s) 112 configured to supply power to various components of the robotic device 100. Among possible power systems, the robotic device 100 may include a hydraulic system, electrical system, batteries, and/or other types of power systems. As an example illustration, the robotic device 100 may include one or multiple batteries configured to provide charge to components that may receive charge via a wired and/or wireless connection. Within examples, components of the mechanical components 114 and electrical components 116 may each connect to a different power source or may be powered by the same power source. Components of the robotic device 100 may connect to multiple power sources 112 as well.

Within example configurations, any type of power source may be used to power the robotic device 100, such as a gasoline engine. Further, the power source(s) 112 may charge using various types of charging, such as wired connections to an outside power source, wireless charging, combustion, or other examples. Other configurations may also be possible. Additionally, the robotic device 100 may include a hydraulic system configured to provide power to the mechanical components 114 using liquid fluid power. Components of the robotic device 100 may operate based on hydraulic fluid being transmitted throughout the hydraulic system to various hydraulic motors and hydraulic cylinders, for example. The hydraulic system of the robotic device 100 may transfer a large amount of power through small tubes, flexible hoses, or other links between components of the robotic device 100. Other power sources may be included within the robotic device 100 within examples.

Mechanical components 114 represent possible hardware of the robotic device 100 that may enable the robotic device 100 to operate and perform physical functions. As a few examples, the robotic device 100 may include actuator(s), extendable leg(s) ("legs"), arm(s), wheel(s), feet, one or multiple structured bodies for housing the computing system or other components, and other mechanical components. The mechanical components 114 may depend on the design of the robotic device 100 and may also be based on the functions and/or tasks the robotic device 100 may be configured to perform. As such, depending on the operation and functions of the robotic device 100, different mechanical components 114 may be available for the robotic device 100 to utilize. In some examples, the robotic device 100 may be configured to add and/or remove mechanical components 114, which may involve assistance from a user and/or other robotic device. For example, the robotic device 100 may be initially configured with four legs, but may altered by a user or the robotic device 100 to remove two of the four legs to operate as a biped. Other examples of mechanical components 114 may be included within some embodiments.

The electrical components 116 may include various components capable of processing, transferring, providing electrical charge or electric signals, for example. Among possible examples, the electrical components 116 may include electrical wires, circuitry, and/or wireless communication transmitters and receiver to enable operations of the robotic device 100. The electrical components 116 may interwork with the mechanical components 114 to enable the robotic device 100 to perform various functions. The electrical components 116 may be configured to provide power from the power source(s) 112 to the various mechanical components 114, for example. Further, the computing system 100 may include electric motors. Other examples of electrical components 116 may exist as well.

Figure 2:
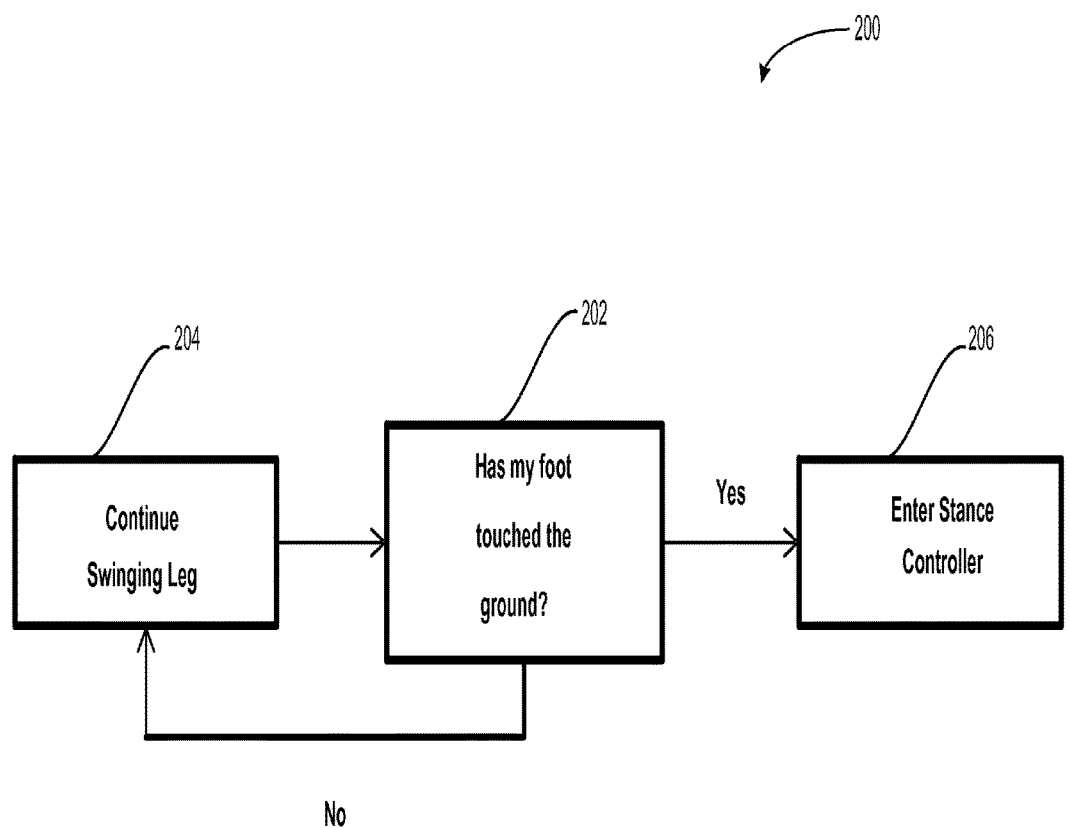
FIG. 2 illustrates an example flowchart for determining a touch-down event.

FIG. 2 illustrates an example flowchart for determining a touch-down event of a robotic device. A computing system of the robotic device may perform the method 200 shown or similar methods for determining if a touch-down event has occurred. The method 200 may enable the computing system to alter operation of a current gait by the robotic device. The method 200 may include one or more operations, functions, or actions as illustrated by one or more blocks 202-206. Although the blocks are illustrated in a sequential order, these blocks may, in some instances, be performed in parallel, and/or in a different order than those described therein. Also, the various blocks may be combined into fewer blocks, divided into additional blocks, and/or removed based up the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be any type of robotic device capable of performing one or multiple gaits, such as the example robotic device 200 illustrated in FIG. 2. Alternatively, the computing device or system that executes some or all of the stored instructions could be another computing device or system, such as a server.

In addition, for the method 200 and other processes and methods disclosed herein, each block in FIG. 2 may represent circuitry that is wired to perform the specific logical functions in the process. Example methods, such as method 200 of FIG. 2 may be carried out in whole or in part by the robotic device and its subsystems. Accordingly, example methods could be described by way of example herein as being implemented by the robotic device. The robotic device may be autonomous, partially autonomous, or controlled completely by a user, for example. However, it should be understood that an example method may be implemented in whole or in part by other computing devices of the robotic device or separate from the robotic device. For example, an example method may be implemented in whole or in part by a server system, which receives data from a device such as those associated with the robotic device.

At block 202, the method 200 may include responsive to receiving an input, determining if a touch-down event has occurred. By way of example, this may be achieved through the use of a plurality of sensors. The sensors may be configured to detect various forces present on the respective end component in order to provide a higher confidence level in determining a touch-down event.

A touch-down event may be configured to have occurred based on a force associated with a given member of the robotic device being above a given threshold. The touch-down event may serve to indicate that the given member of the robotic device has made physical contact with the ground. In another example, the touch-down event may serve to indicate that the given member of the robotic device has made contact with an element other than the ground of an environment. In this example, the element may represent a surface such as a wall of a building. Other examples of elements may be possible depending on a given environment.

In one example, the touch-down sensor may be configured to provide a signal based on a force that is present on the limb of the robotic device. In this example, the touch-down sensor comprises a cylindrical load cell. The cylindrical load cell may be configured to determine an axial force present on the respective end component. In another example, the cylindrical load cell may be configured to sense omnidirectional loads as well.

At block 204, the method 200 may include responsive to receiving an input, continuing to swing a given leg of the robotic device. As the computing system of the robotic device receives inputs from various sources, the computing system may process the inputs to determine if the given leg of the robotic device should continue being moved. If a touch-down event has not occurred, then the computing system will continue swinging the leg in order to reach a position within an environment and prompt a touch-down event.

By way of example, the robotic device may continue swinging the leg through the use of an actuator coupled to the leg. The actuator may enable a certain amount of motion while the actuator is being operated. In this example, the actuator would enable the robotic device to traverse through a variety of environments.

At block 206, the method 200 may include responsive to receiving an input, the computing system may continue processing through the use of a stance controller. The stance controller may allow the robotic device to perform other functions while the robotic device is finished with a given gait. By way of example, this may permit the robotic device to analyze a given environment and determine a course of action based on a predetermined directive.

Figure 3:
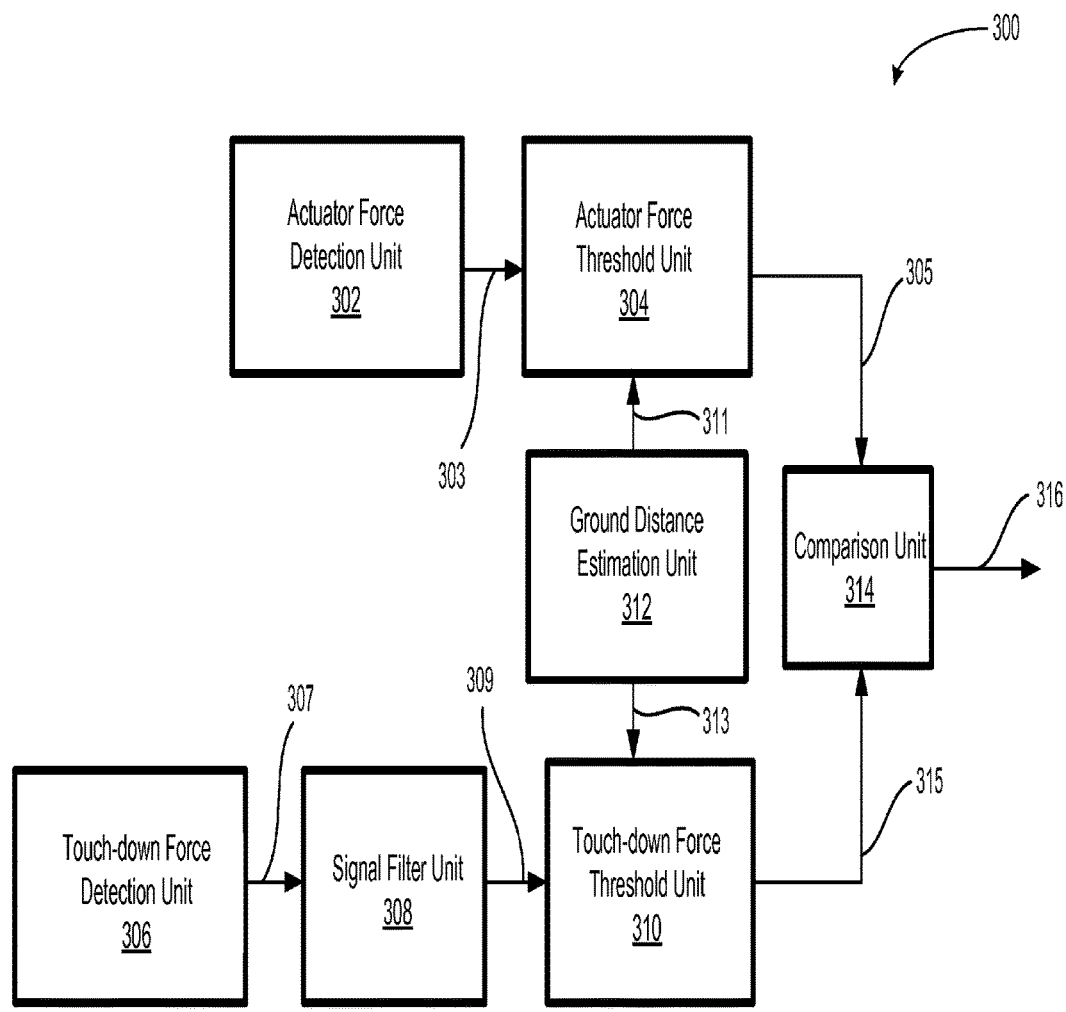
FIG. 3 illustrates a touch-down event determination system.

FIG. 3 illustrates a touch-down event determination system 300, according to an example embodiment. The system 300 includes an actuator force detection unit 302, an actuator force threshold unit 304, a touch-down force detection unit 306, a signal filter unit 308, a touch-down force threshold unit 310, a ground distance estimation unit 312, and a comparison unit 314.

The actuator force detection unit 302 may be configured to determine a force present on an end component of a robotic device. By way of example, the robotic device may comprise one or more members with a respective end component coupled by one or more joints. At a given time, the one or more members will be positioned at a given angle with respect to the one or more joints. The actuator force detection unit 302 may be configured to determine the amount of force present on the respective end component of the robotic device based on a force applied to a member and a given orientation of the one or more members with respect to each other. A mathematical transform of the force applied to the member based on the given orientation of the one or more members with respect to each other may provide an estimate of how much force is being applied to the respective end component. The estimate of how much force is being applied to the respective end component may be provided as an output signal 303. Other examples of determining the amount of force present on the end component are possible as well.

The actuator force threshold unit 304 may be configured to receive the output signal 303 and generate an actuator force signal 305. In one example, the actuator force threshold unit 304 may apply the output signal 303 to a large force threshold. The large force threshold may serve to provide an indication of whether a touch-down event has occurred based on the output signal 303 satisfying the large force threshold.

In one instance, the large force threshold is intended to prevent a false touch-down event from occurring. A false touch-down event may be referred to as a false positive. A false positive is a problem that may cause an end component of the limb of the robotic device to be set down in an incorrect position.

In another instance, the large force threshold may also serve to prevent another example false touch-down event such as a false negative from occurring. A false negative may cause the robotic device to continue swinging the limb after a touch-down event has occurred. This may result in damage to the limb and/or require the waste of energy associated with the robotic device.

The touch-down force detection unit 306 may be configured to determine a force present on a member of a robotic device. In one example, the touch-down force detection unit 306 may comprise a dedicated touch-down sensor that is coupled to the robotic device. The force present the member of the robotic device may be detected by the dedicated touch-down sensor based on the capabilities of the dedicated touch-down sensor and a placement of the dedicated touch-down sensor on the robotic device. By way of example, based on a determined force present on the member of the robotic device, the touch-down force detection unit 306 may be configured to generate a force detection output signal 307.

In another example, the touch-down force detection unit 306 may comprise a bladder sensor provided on an end component of a limb of a robotic device and configured to provide an output signal. The bladder sensor may include a tube of air that is provided at a sole of the end component and a pressure sensor coupled to the tube of air. In this instance, the pressure sensor may be configured to determine a magnitude of pressure in the tube. The pressure associated with the air may increase as the end component makes contact with an element of an environment. Depending on the element, the pressure will increase to a given magnitude and be detected by the pressure sensor. The magnitude of pressure in the tube may then be provided as the force detection output signal 307.

The signal filter unit 308 may be configured to receive the force detection output signal 307 and generate a filtered output signal 309. In one example, the signal filter unit 308 may comprise a DC blocking algorithm. The DC blocking algorithm may serve to eliminate a drift associated with the force detection output signal 307. In one example, the signal filter unit 308 may provide a DC balanced filtered output signal 309.

The touch-down force threshold unit 310 may be configured to receive the filtered output signal 309 and generate a touch-down force signal 315. In one example, the touch-down force detection unit 310 may apply the filtered output signal 309 to a small force threshold. The small force threshold may be configured to be less than the large force threshold associated with the actuator force threshold unit 304. A lowered threshold may permit a higher sensitivity in force detection by the touch-down force detection unit 306. In one example, a lowered threshold may be helpful in order to provide a fast response when a touch-down event has occurred.

The ground distance estimation unit 312 may be configured to determine an estimate in distance from a member of the robotic device to the ground. Based on the estimate, the ground distance estimation unit 312 may generate an actuator force estimation signal 311 provided to the actuator force threshold unit 304. Additionally, the ground distance estimation unit 312 may generate a touch-down force estimation signal 314 provided to the touch-down force threshold unit 310. Estimating the distance may enable the large force threshold and the small force threshold to be updated in order to increase the accuracy associated with a touch-down event.

By way of example, a computing system of a robotic device may be configured to receive information indicating an estimated distance between an end component of a limb of the robotic device and a portion of an environment. Based on the information indicating the estimated distance, the computing system may be configured for determining an update to one or more of the large force threshold and the small force threshold based on the estimated distance. Updating either threshold may serve to reduce the number of false positives or false negatives experienced by the robotic device due to more accurate sensing of elements in an environment.

Further, in some examples, the computing system of the robotic device may be configured to continuously updating one or more of the large force threshold and the small force threshold based on the estimated distance. A continuous update of either or both the large force threshold and the small force threshold may be based on an expectation of when the robotic device will encounter a touch-down event. In one example, the computing system of the robotic device may increase the large force threshold based on the limb of the robotic device being far from the ground in order to reduce a number of false positives. In this example, the computing system may then reduce the large force threshold when the limb of the robotic device is near the ground in order to detect a touch-down event as quickly as possible. By way of example, the robotic device may benefit from a continuous update of either threshold as the robotic device is expected to operate in an environment with a plurality of elevation differences.

The comparison unit 314 may be configured to receive the actuator force signal 305 and the touch-down force signal 315 and generate a touch-down event signal 316. Based on the actuator force signal 305 and the touch-down force signal 315, a determination of a touch-down event is made by the comparison unit 314. By way of example, the comparison unit 314 may combine the actuator force signal 305 and the touch-down force signal 315 signal. In this example, the comparison unit 314 may determine whether the combined signal satisfies a threshold in order to determine a touch-down event. In another example, based on the filtered output signal 309 satisfying the small force threshold, the comparison unit 314 may be configured to determine an initial touch-down of the end component of the limb with a portion of an environment. Further, based on the output signal 303 satisfying the large force threshold, the comparison unit 314 may be configured to determine that the end component of the limb is in contact with the portion of the environment. Other examples are possible as well.

By way of example, the comparison unit 314 may generate the touch-down event signal 316 that may serve to indicate a touch-down event has occurred. The touch-down event signal 316 may be provided as an input to another subcomponent of the robotic device in order to transition to a different operation associated with the robotic device based on the touch-down event.

It is noted that functional blocks for the system 300 are illustrated in FIG. 3 as separate blocks for convenience. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

Figure 4A:
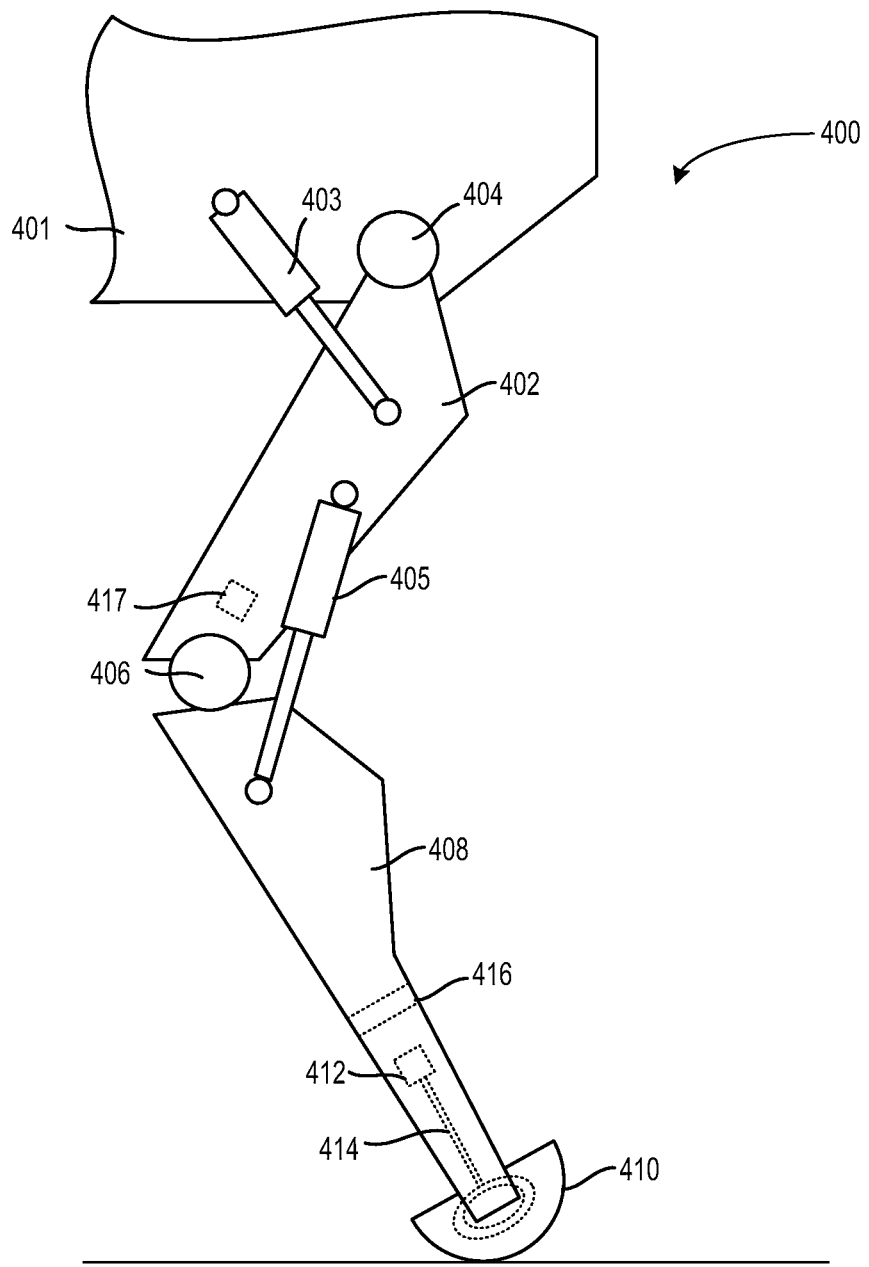
FIG. 4A illustrates a side view of an example robotic limb.

FIG. 4A illustrates a side view of an example robotic limb 400. The robotic limb 400 includes a member 402 having a first end that is connected to a biped robotic device 401 at a joint 404. The example robotic limb 400 also includes a hydraulic actuator 403 connected between member 402 and the robotic device 401. The member 402 has a second end that is rotatably connected to a first end of a second member 408 at a second joint 406. The example robotic limb 400 also includes a second hydraulic actuator 405 connected between member 402 and the second member 408. The second member 408 has a second end that is connected to an end component 410. The example robotic limb 400 also includes a sensor 412 coupled to the second member 408. The sensor 412 is coupled to a tube 414 that is coupled to the end component 410. The example robotic limb 400 also includes a second sensor 416 that is coupled to the second member 408. The example robotic limb 400 also includes a third sensor 417 that is coupled to the member 408.

Referring to FIG. 4A, the example robotic limb 400 includes a member 402. The member 402 may be rotated around the joint 404 as part of a movement associated with a gait of the robotic device 401. The member 402 may be configured out of any material such as a aluminum, steel, and stainless steel. The member 402 may be configured to withstand a high amount of force depending on various subcomponents associated with the robotic device 401 and in addition to any load placed on the biped robotic device 401.

The joint 404 may be configured to enable a certain amount of degree of rotation in order to provide the member 402 with the freedom to move up and down. The joint 404 may be configured in various ways depending on an intended application associated with the biped robotic device 401.

As shown in FIG. 4A, the hydraulic actuator 403 is coupled to the biped robotic device 401 and the member 402. By actuating the hydraulic actuator 403, member 402 will be moved by rotating the around joint 404. Rotating the member 402 may raise the robotic limb 400 up from the ground. In order to bring the robotic limb 400 back to the ground, the member 402 would be rotated in a counter direction once again through the use of actuation of the hydraulic actuator 403. By way of example, the hydraulic actuator 403 is one component that enables the robotic limb 400 to be operated and thereby move the biped robotic device 401. As the biped robotic device 401 is moved, contact of a respective end component with one or more elements on an environment may occur.

The second joint 406 is shown in FIG. 4A coupled to the member 402 and the second member 408. The second joint 406 is configured to operate in a manner similar to the joint 404. The second joint 406 is configured to allow the second member 408 to rotate around the second joint 406 and may raise the robotic limb 400 up from the ground.

Referring to FIG. 4A, the second hydraulic actuator 405 is coupled to the member 402 and the second member 408. In a similar manner to the hydraulic actuator 403, actuating the second hydraulic actuator 405 will cause the second member 408 to be moved by causing the second member 408 to rotate around the second joint 406. In one example, movement of a given limb of the robotic device 401 may be achieved through the use of the second hydraulic actuator 405.

The second member 408 may include a material similar to the member 402. The second member 408 may also be coupled to a plurality of sensors that server to indicate a touch-down event. The second member 408 may be coupled to the end component 410.

As shown in FIG. 4A, the end component 410 is coupled to the second member 408 and is configured to come in contact with one or more elements of the environment. By way of example, the end component may be configured to receive a tube 414. The end component 410 may comprise a material that is capable of withstanding repeated shock loads and also resistant to fluids.

By way of example, the end component 410 may comprise a rubber material with a specified hardness. This would allow a temporary deformation to occur at the end component 410 as contact is made with a given element of the environment. In another example, the end component 410 may be configured to receive the tube 414 within a channel formed throughout the end component 410. The temporary deformation would be caused as a result of a given force present on the end component 410 and possibly be an indication that a touch-down event has occurred based on a change in the pressure of the tube 414.

As shown in FIG. 4A, the sensor 412 is coupled to the second member 408. The sensor 412 is also coupled to the tube 414 and configured to detect a change in pressure. In one example, the sensor 412 may be a pneumatic sensor that is capable of detecting a change in pressure of an air or liquid contained within the tube 414.

The tube 414 may comprise a material that is capable of exhibiting deformation due to a force present on the tube 414. Further, in some examples, the tube 414 may comprise a material that is capable of returning to a form similar to when no pressure is directed towards the tube 414. An instance where there may be no pressure directed towards the tube 414 may be a result of the second member 408 lifted from the ground.

In another example, the tube 414 may comprise a bladder that is provided at a sole of the end component 410 as shown in FIG. 4A. In this example, the bladder may include air or liquid that is capable of causing a change in pressure based on a force applied to the bladder. The change in the pressure of a given fluid of the tube 414 may be detected by a sensor 412 coupled to the bladder in order to provide an indication of a touch-down event.

Further, to assist with detection of a touch-down event, a second sensor 416 may be configured to detect a force present on the second member 408, as shown in FIG. 4A. The second sensor 416 may provide additional information that may be indicative of a touch-down event.

In one example, the second sensor 416 may be configured as a touch-down sensor and coupled to the end component 410. In this example, the touch-down sensor may be configured as a load cell that is configured to determine a force applied to the end component 410. The force applied to the end component 410 may be then applied to a filter that is configured to reduce the number of false positives or false negatives from occurring.

In another example, the second sensor 416 may be configured for determining a plane of the environment. In this example, the second sensor may be configured to provide a plane estimation signal to the one or more processors for determining a contact with the one or more elements of the environments. The plane estimation signal may provide a distance between a given end component and a given element of the environment. For example, the distance between the given end component and the given element may be three feet. One or more processors may use the distance in addition to other information such as a speed associated with the given end component to determine a threshold indicative of a touch-down event. By way of example, the second sensor 416 may comprise a camera coupled to a motorized mount. The motorized mount may be configured to update a field of view of the camera based on a motion signal received by the computing system of the biped robotic device 401. The motion signal may be indicative of a movement associated with the respective end component and thereby assist with updating a position of the camera.

One or more processors may be associated with the biped robotic device 401 and may be configured to receive an output of the sensor 412 and an output of the second sensor 416 in order to determine contact with the one or more elements of the environment based on the received outputs. The one or more processors may also be configured to determine additional information from various sensors associated with the biped robotic device 401.

Referring to FIG. 4A, a third sensor 417 may be coupled to the member 402. The third sensor 417 may be configured for determining a position associated with a gait of the biped robotic device 401. In one instance, the third sensor 417 may be configured as a gyroscope that is capable of measuring an orientation in a three-dimensional space. In this instance, as the member 402 is moved through hydraulic actuator 403, the gyroscope may determine the position associated with the gait of the biped robotic device 401 based on a given movement within the gyroscope.

Figure 4B:
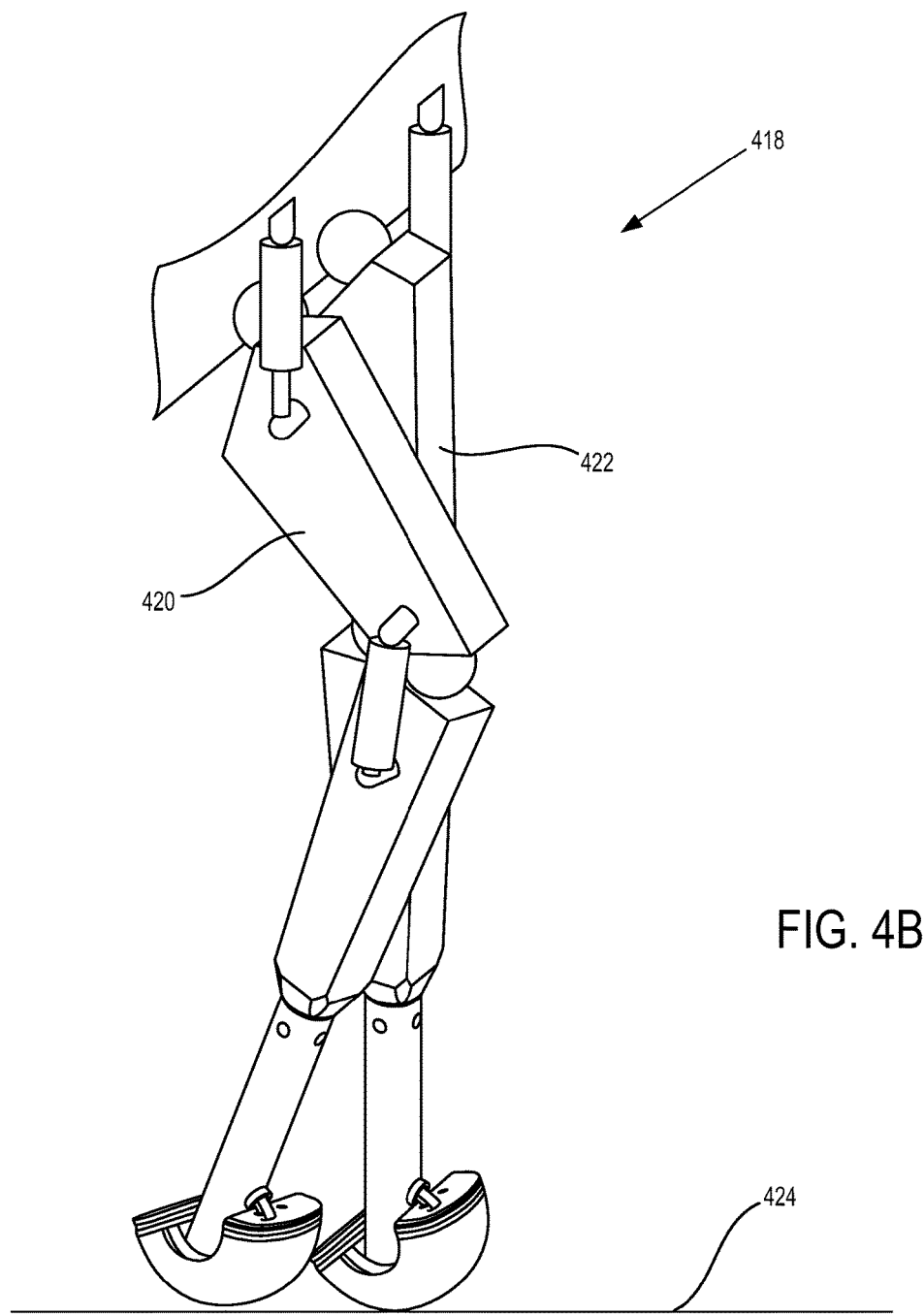
FIG. 4B illustrates an example biped robot according to an example implementation.

FIG. 4B illustrates a biped robot 418 according to an example implementation. The biped robot 418 includes a first limb 420 and a second limb 422. The first limb 420 and the second limb 422 may each comprise the robotic limb 400 from FIG. 4A. By way of example, the biped robot 418 may comprise the touch-down event determination system 300 of FIG. 3.

Referring to FIG. 4B, the first limb 420 is shown in a position based on a current gait of the biped robot 418. In this instance, the first limb 420 is shown not contacting the ground surface 424. In one example, by actuating one or more hydraulic actuators associated with the first limb 420, the biped robot 418 may be capable of moving the first limb 420 along the ground surface 424.

As shown in FIG. 4B, the second limb 422 is in contact with the ground surface 424. By way of example, the second limb 422 may remain in contact with the ground surface 424 until information indicative of a touch-down event associated with the first limb 420 is received by a sensor (not shown). By way of example, determining when a touch-down event occurs between the first limb 420 and/or the second limb 422 may provide the biped robot 418 with information to prevent the biped robot 418 from falling over an element within an environment. In another example, by actuating one or more hydraulic actuators associated with the second limb 422 and one or more hydraulic actuators associated with the first limb 420, the biped robot 418 may have the capability to traverse the environment.

For clarity, only the first limb 420 and the second limb 422 of the biped robot 418 have been shown in FIG. 4B. The biped robot 418 may include more or less components than those shown in FIG. 4B. For example, the biped robot 418 may include other mechanical components 114, electrical components 116, and sensors 110 associated with robotic device 100 of FIG. 1.

Figure 5A:
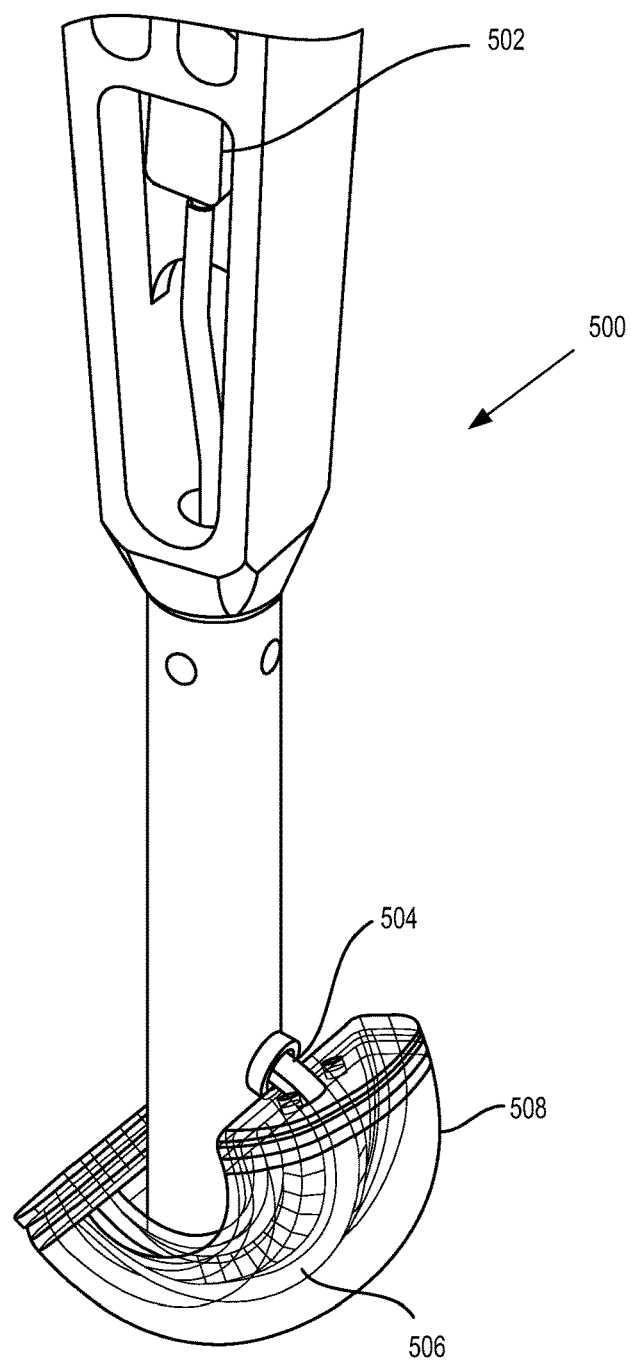
FIG. 5A illustrates a portion of another example robotic limb.

FIG. 5A illustrates a portion of another example robotic limb 500. The robotic limb 500 includes a sensor 502 coupled to a bladder 504. The bladder 504 is provided at a sole 506 of an end component 508.

In one example, the sensor 502 may be comprises a pressure sensor that is configured to determine a change in pressure associated with air within the bladder 504. The use of air as the sensing helps to reduce a number of reliability and stability issues that are common with other sensors configured to detect a force. The sensor 502 may be designed in a way that makes the sensor 502 approximately immune to overload because only a certain amount of air pressure can be applied. By way of example, the sensor 502 may be coupled to the robotic limb 500 in a manner that enables easy access to the sensor 502 in order to provide maintenance to the sensor 502.

Referring to FIG. 5A, the bladder 504 may comprise any number of materials that permit the bladder 504 to contain air or liquid. Providing the bladder 504 at the sole 506 allows for avoidance of inertial forces to be introduced into the output signal associated with sensor 502. The bladder 504 may be coupled to the end component 508 in a way that allows for the bladder 504 to be replaced when the bladder 504 has been worn or damaged.

The end component 508 may be designed in way that enables the end component 508 to be removed easily. In one example, the end component 508 may be coupled to the robotic limb 500 using fasteners. The end component 508 may include a material that is capable of interacting with various elements in an environment and allows a robotic device to traverse through the environment. By way of example, the end component 508 may comprise a synthetic rubber with a predetermined hardness.

Figure 5B:
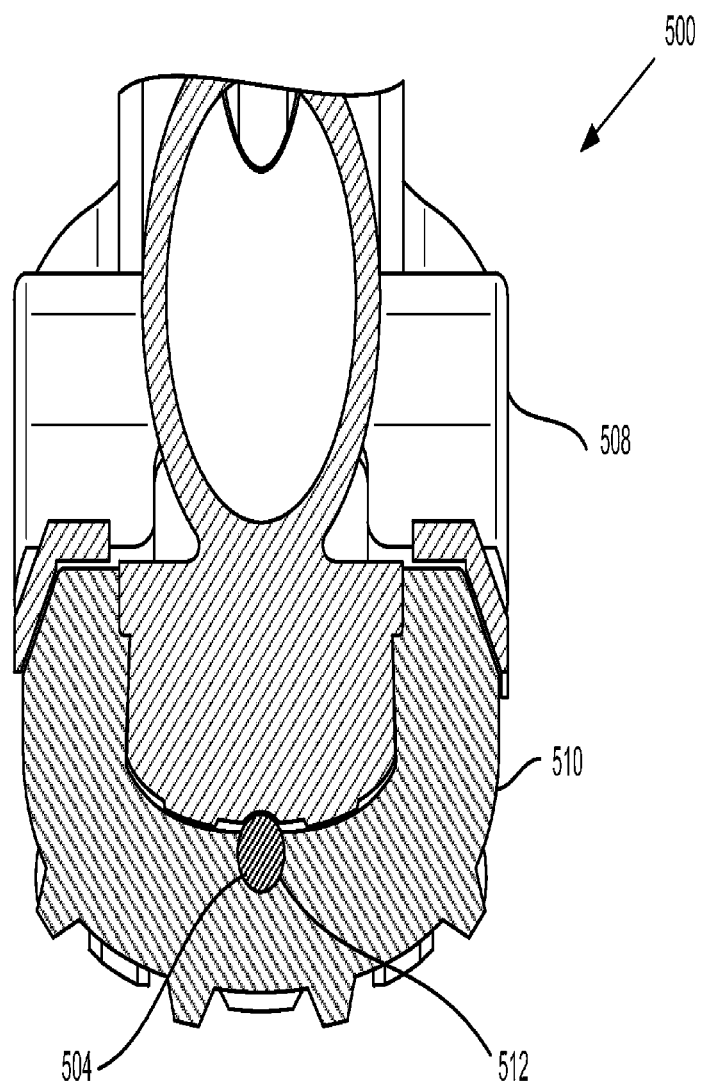
FIG. 5B illustrates a cross-sectional view of an example end component of the example robotic limb from FIG. 5A.

FIG. 5B illustrates a cross-sectional view of the example end component 508 of the example robotic limb 500. The end component 508 comprises a foot mount 510 configured for interaction with an environment. The foot mount 510 includes a channel 512 configured for receiving the bladder 504.

The foot mount 510 is configured to come into contact with elements of an environment and may be configured in a way to withstand multiple shock loads. In one example, the foot mount 510 may comprises a rubber with a certain hardness that enables a force present on the foot mount 510 to also cause a deformation of the bladder 504. The deformation of the bladder 504 will cause a change in pressure that will be detected by an example pressure sensor coupled to the bladder 504.

As shown in FIG. 5B, the channel 512 is configured to receive the bladder 504 so that the bladder 504 may be in close proximity to an element in an environment that comes into contact with the end component 508. Close proximity will enable the bladder 504 to be affected by a force associated between the element and the end component 508. The channel 512 may be configured in any number of ways that allow for fast detection of a force present on the end component 508.

Figure 6A:
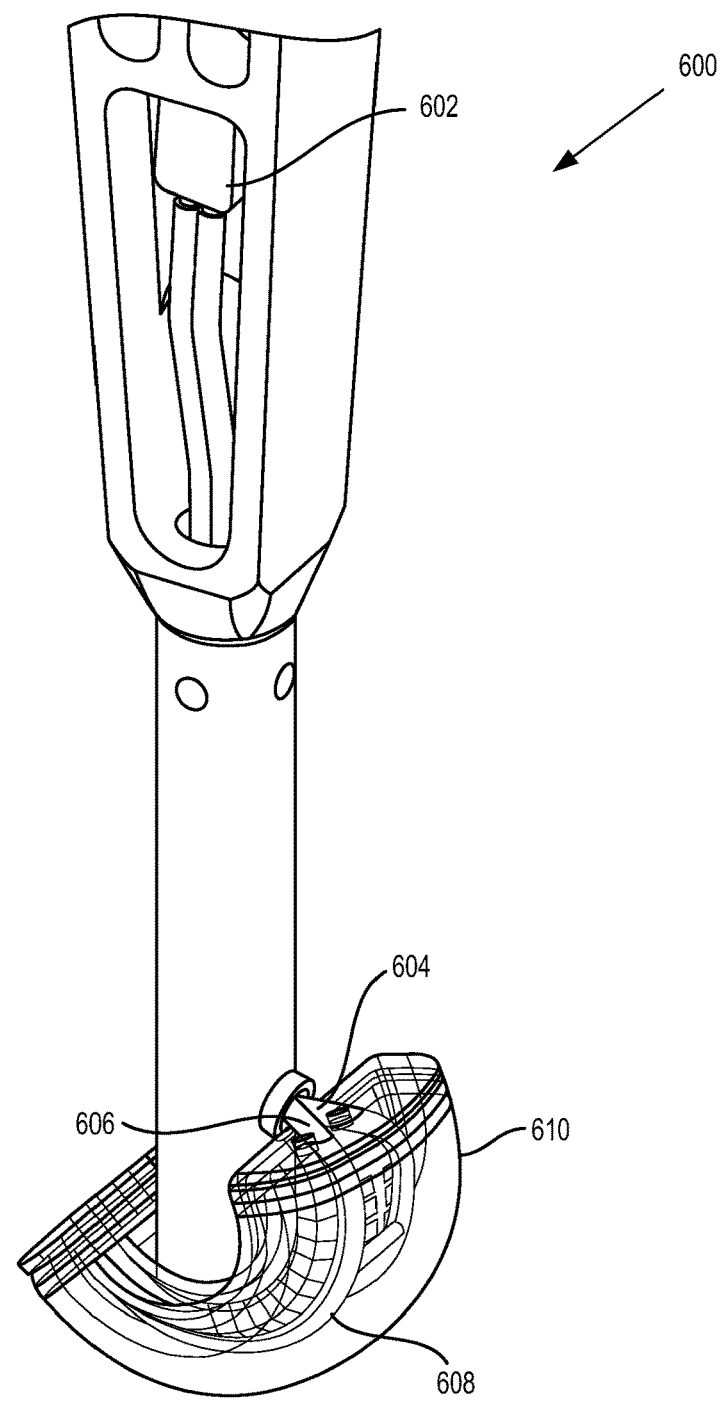
FIG. 6A illustrates a portion of another example robotic limb.

FIG. 6A illustrates a portion of another example robotic limb 600. The robotic limb 600 includes a sensor 602 coupled to a bladder 604 and second bladder 606. The bladder 604 is provided at a sole 608 of the end component 610. The second bladder 606 is also provided at a sole 608 of the end component 610.

Referring to FIG. 6A, the sensor 602 may comprise a pneumatic sensor that is configured to determine a change in pressure associated with a fluid within the bladder 604 and a second fluid within the second bladder 606. By way of example, depending on the location of contact between the end component 610 and an element in the environment, the sensor 602 may be capable of detecting a pressure change in one of the bladders first and thereby improve on the response time needed to detect a touch-down event. In another example, the sensor 602 may be designed in a way that makes use of the bladder 604 and the second bladder 606 to determine if a touch-down event has occurred by comparing a pressure differential between the bladder 604 and the second bladder 606.

The bladder 604 may comprise any number of materials that permit the bladder 604 to contain a fluid. Providing the bladder 604 at the sole 608 allows for the avoidance of inertial forces to be introduced into the output signal associated with sensor 602. The bladder 604 may be coupled to the end component 610 in a way that allows for the bladder 604 to be replaced when the bladder 604 has been worn or damaged.

The second bladder 606 may also comprise any number of materials that permit the bladder 606 to contain a fluid. Similar to the bladder 604, by providing the second bladder 606 at the sole 608 there will be less inertial forces associated with the output signal of the sensor 602. The second bladder 606 may also serve as a built in redundancy in the event that the bladder 604 becomes damaged and the robotic device is in a remote location where the robotic device cannot be serviced quickly. Any number of additional bladders may be implemented based on an application need.

The end component 610 may be designed in way that enables the end component 610 to be removed easily. In one example, the end component 610 may be coupled to the robotic limb 600 by means of a latching mechanism. The end component 610 may comprises a material that is capable of interacting with various elements in an environment and allow a robotic device to traverse through the environment. By way of example, the end component 608 may comprise a synthetic rubber with a predetermined hardness.

Figure 6B:
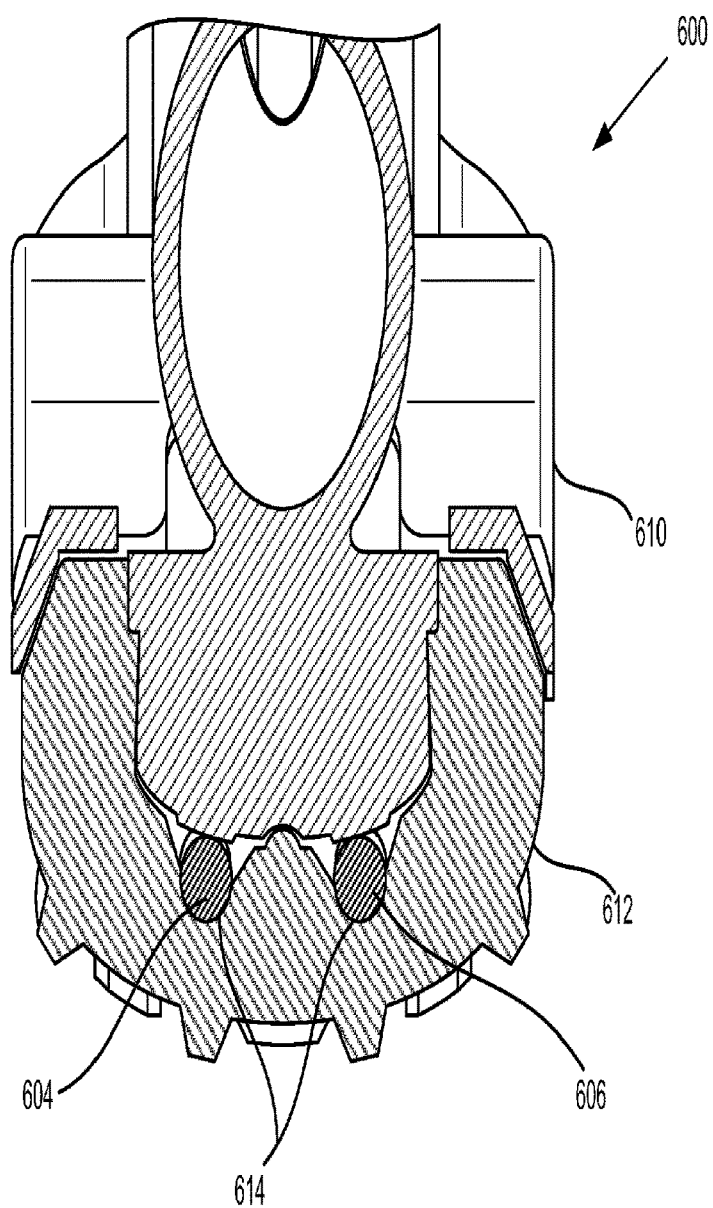
FIG. 6B illustrates a cross-sectional view of an example end component of the example robotic limb from FIG. 6A.

FIG. 6B illustrates a cross-sectional view of the example end component 610 of the example robotic limb 600. The end component 610 comprises a foot mount 612 configured for interaction with an environment. The foot mount 612 includes a plurality of channels 614 configured for receiving a plurality of bladders.

The foot mount 612 is configured to come into contact with elements of an environment and may be configured in a way to withstand multiple shock loads. In one example, the foot mount 612 may comprises a rubber with a certain hardness that enables a force present on the foot mount 612 to also cause a deformation on either and/or both the bladder 604 and second bladder 606. The deformation of the bladders will cause a change in pressure that will be detected by an example pressure sensor coupled to the bladders.

As shown in FIG. 6B, the plurality of channels 614 are configured to receive the bladder 604 and the second bladder 606. By way of example, providing multiple bladders throughout the foot mount 612 may assist in determining if a force is present on a particular side of the foot mount 612 based on a higher pressure change in one of the multiple bladders. A force present on a particular side of the foot mount 612 may assist an example robotic device with information relevant to adjusting a position of the robotic limb 600. The plurality of channels 614 may be configured in any number of ways that allow for fast detection of a force present on the end component 508.

Figure 7:
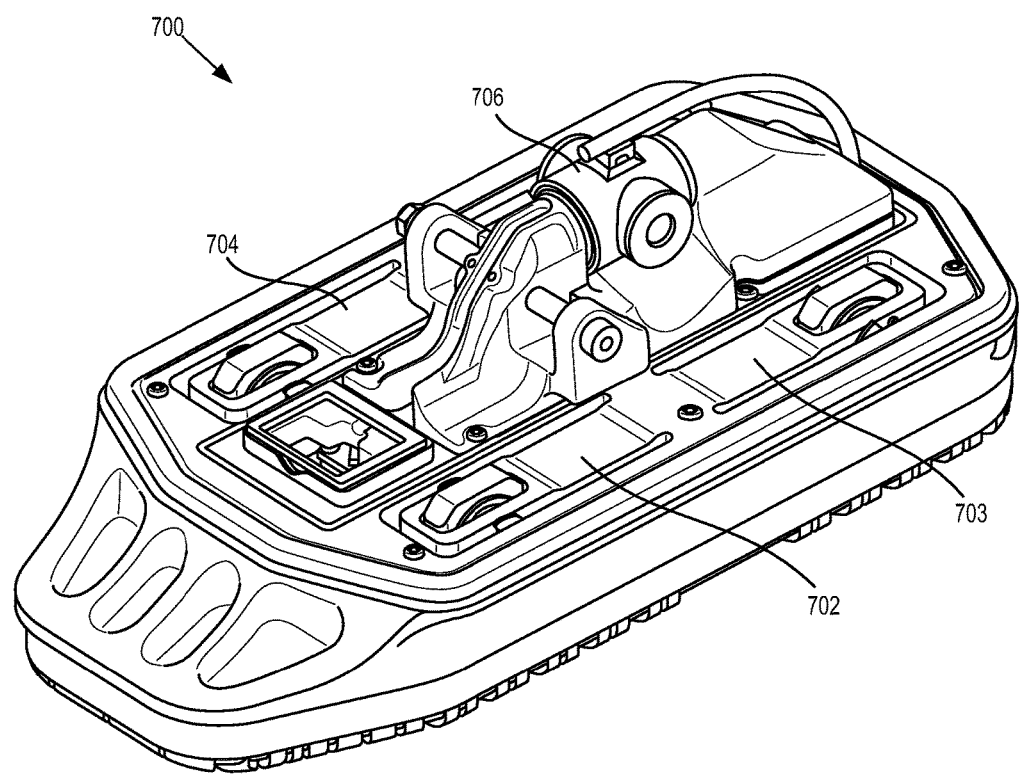
FIG. 7 illustrates another example end component of an example robotic device.

FIG. 7 illustrates another example end component 700 of an example robotic device. The end component 700 comprises a plurality of load cells 702, 703, and 704. The end component 700 also comprises a joint 706 for coupling the end component 700 to a robotic limb.

Referring to FIG. 7, the plurality of load cells 702, 703, and 704 are positioned along the end component 700 in way that enables detection of a ground force. By way of example, the plurality of load cells 702, 703, and 704 may be multi-axis fully calibrated and provide additional information for walking and balance control. In another example, the multiple force measurements may be combined into a single signal that pertains to an upward force.

The joint 706 may be coupled to an example robotic limb. The joint 706 may also comprises a hydraulic actuator in order to enable the end component to rotate around the joint for proper movement as an example robotic device is moving. By way of example, the joint 706 may be configured to receive information associated with a force measurements detected by the plurality of load cells 702, 703, and 704 in order to balance the example robotic device as the robotic device moves through an environment.

Figure 8:
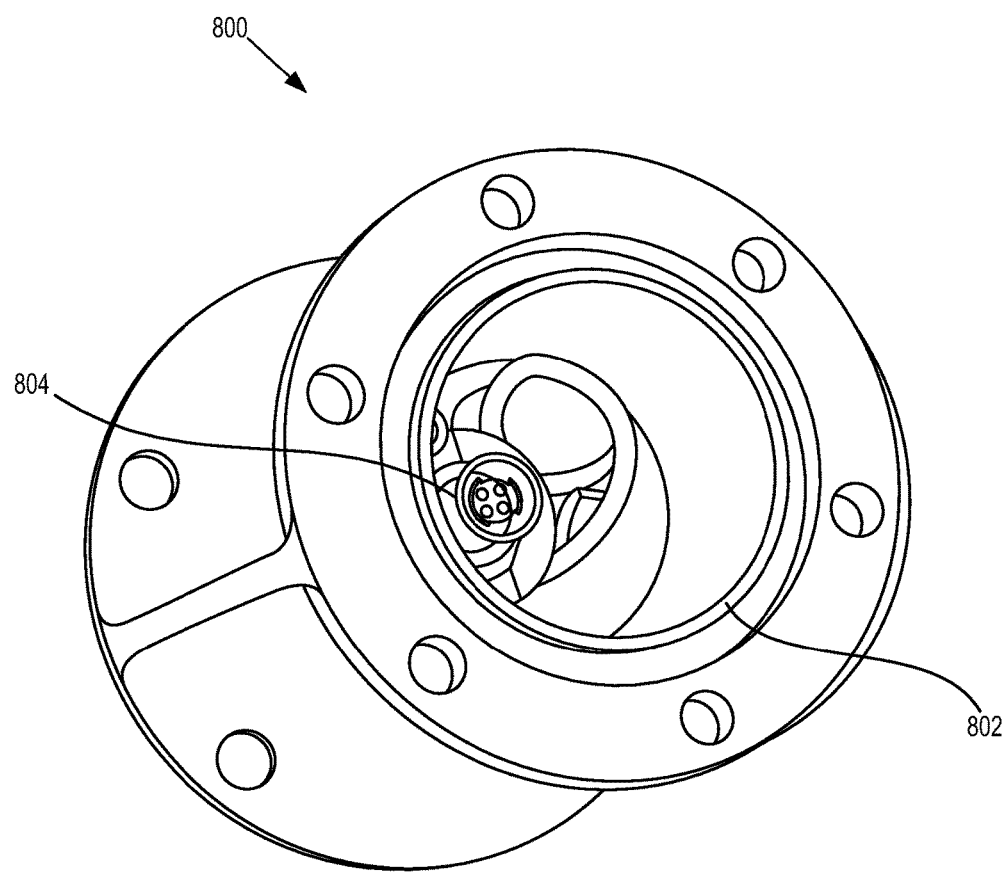
FIG. 8 illustrates another example end component of an example robotic device.

FIG. 8 illustrates another example end component 800 of an example robotic device. The end component 800 comprises a cylindrical load cell 802. The cylindrical load cell 802 comprises a sensor connector 804.

Referring to FIG. 8, the cylindrical load cell 802 is coupled to the end component 800. In one example, the cylindrical load cell is configured to detect an axial force present on an example robotic limb. The detection of the axial force may be used in addition to other force signals present on the robotic limb in order to improve the accuracy of a touch-down event. The cylindrical load cell 802 may be comprise stainless steel or aluminum and configured to detect a wide range of pressure.

The sensor connector 804 enables a sensor to be connected in a quick manner and thereby allow for maintenance or replacement of the cylindrical load cell 802. By way of example, the end component 800 may be designed to enable the sensor connector 804 to be accessible through a given side or the end component 800.

Figure 9:
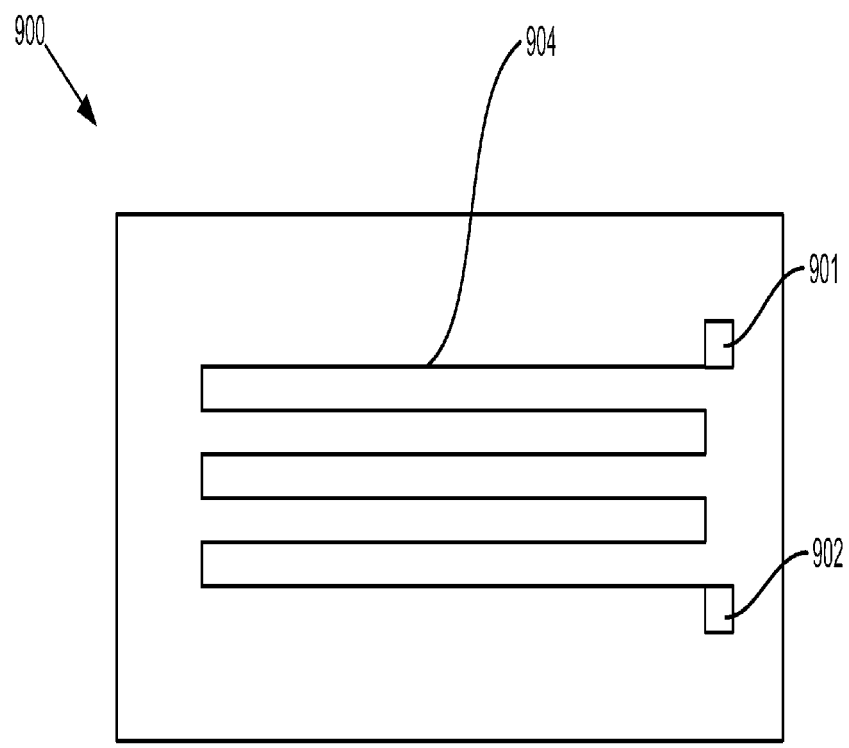
FIG. 9 illustrates a side view of a strain gauge.

FIG. 9 illustrates a side view of a strain gauge 900. The strain gauge 900 comprises terminals 901 and 902. The terminals 901 and 902 are connected to the strain sensitive pattern 904.

The terminals 901 and 902 may be configured to measure a resistance associated with the strain gauge 900. The resistance associated with the strain gauge 900 may increase or decrease depending on a force present on an example robotic limb. In one example, the terminals 901 and 902 may comprise copper-coated tabs that enable soldering of wires directly to the gauge.

Referring to FIG. 9, the strain sensitive pattern 904 may be designed in various ways. The strain sensitive pattern 904 may be configured on various factors such as accuracy required, temperature compensation, and the environment just to name a few. In one example, the strain sensitive pattern 904 may temporarily deform and shorten in length while a force is present on an example robotic limb. A shortened length associated with the strain sensitive pattern 904 may cause a decrease in resistance between the terminals 901 and 902 and thereby provide an indicator of the amount of force present the example robotic limb.

Figure 10:
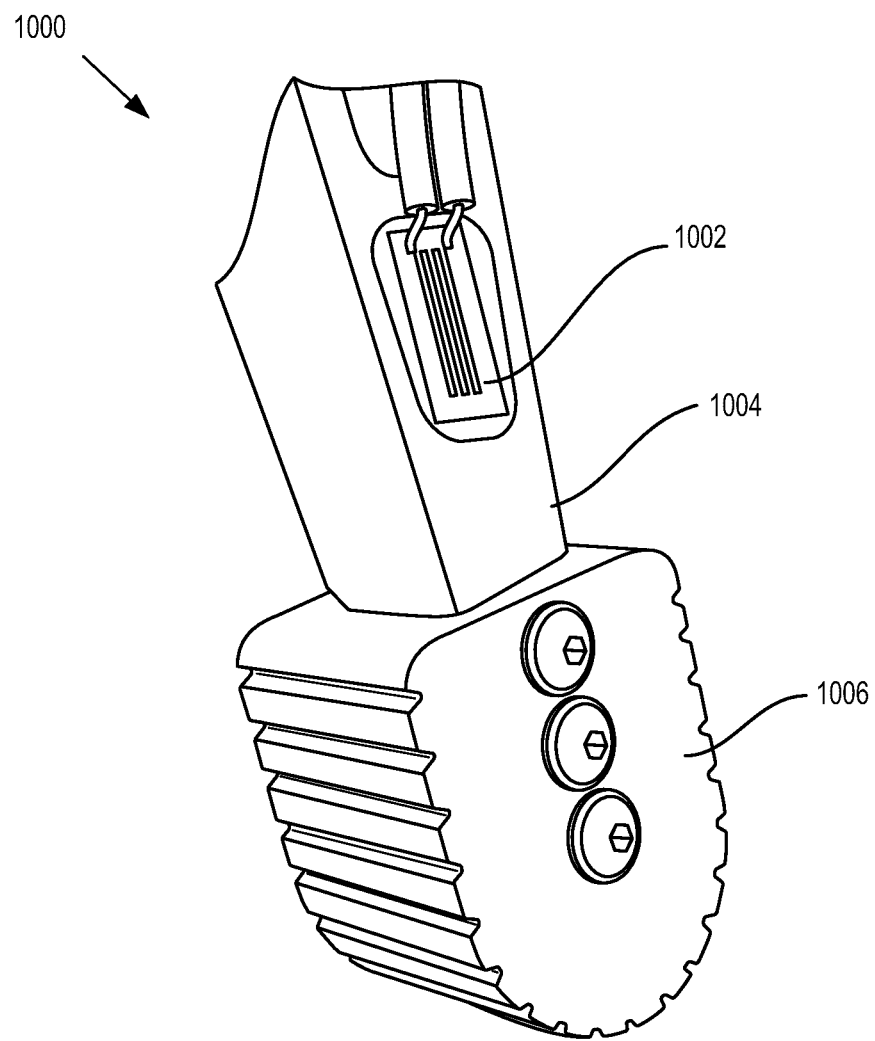
FIG. 10 illustrates an example implementation of a strain gauge coupled to an example limb of a robotic device.

FIG. 10 illustrates an example implementation of a strain gauge 1002 coupled to an example limb 1004 of a biped robotic device 1000. The example limb 1004 is coupled to an end component 1006.

Referring to FIG. 10, the strain gauge 1002 may be coupled to the example limb 1004 with the use of an epoxy. The orientation of the strain gauge is aligned based on a direction of an expected force to be measured. A change in a resistance associated with the strain gauge would help to determine if a force is present on the example limb 1004 and thereby provide information associated with a touch-down event. There are many implementations associated with the strain gauge 1002. In one example, two separate strain gauges may be coupled to the example limb 1004.

The end component 1006 may comprise a material such as synthetic rubber. The synthetic rubber may allow a force present on the end component 1006 to cause a deformation associated with the strain gauge 1002. As long as the force present on the end component 1006 preserves an elastic limit associated with the strain gauge 1002, the amount of force present may be inferred by measuring a resistance associated with the strain gauge 1002 and thereby enabling the strain gauge to act as a touch-down sensor.

Figure 11:
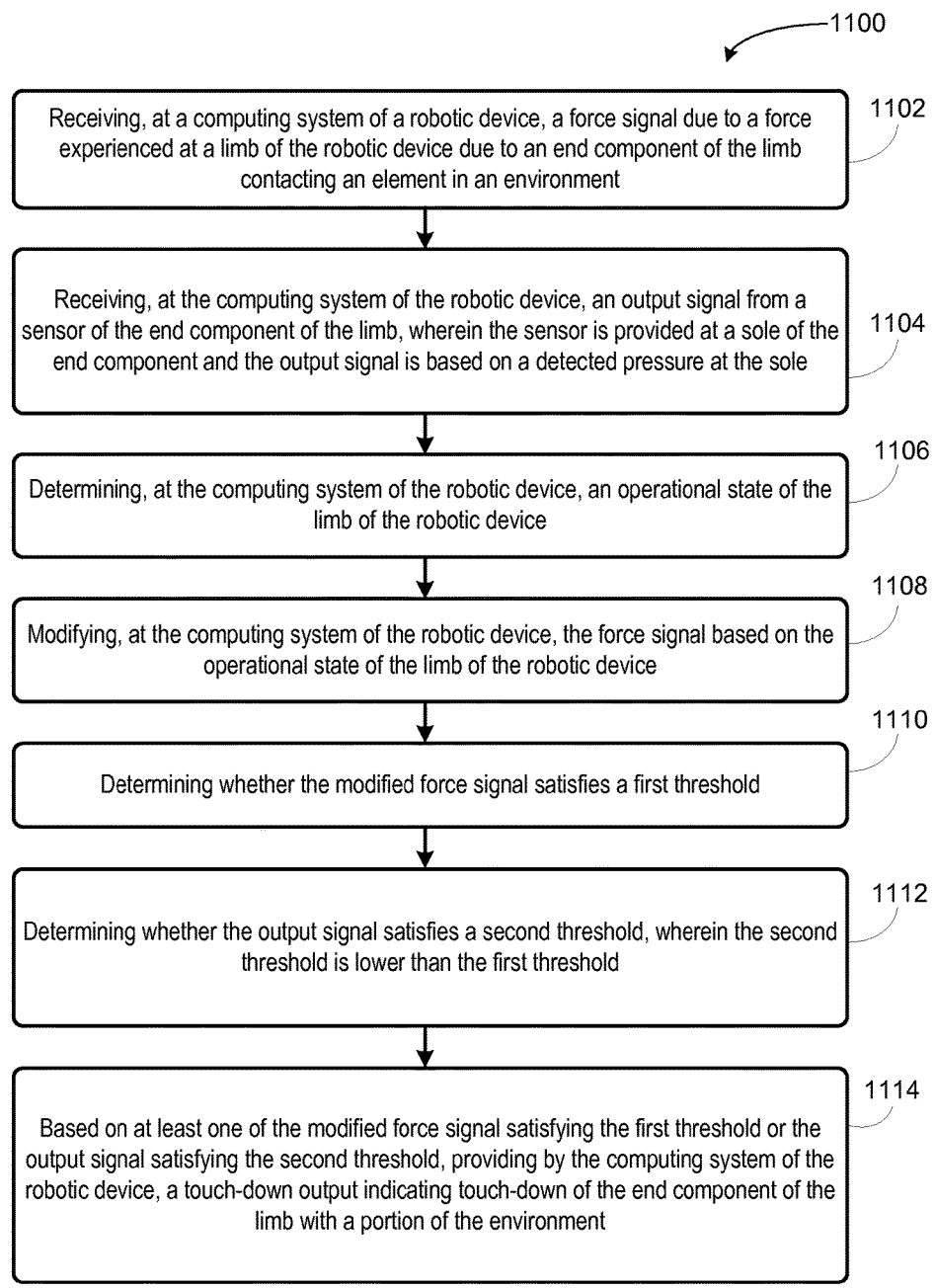
FIG. 11 illustrates a block diagram of another method according to an example embodiment.

FIG. 11 illustrates a block diagram of another method 1100, according to an example embodiment. Method 1100 may include one or more operations, functions, or actions as illustrated by one or more of blocks 1102-1114. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 1102, the method 1100 includes receiving, at a computing system of a robotic device, a force signal due to a force experienced by an actuator of a limb of the robotic device due to an end component of the limb contacting an element in an environment. The computing system of the robotic device may also analyze additional information such as the speed, operation, and/or time provided by various components in order to identify what position of a gait of the robotic device is currently undergoing. Based on the gait of the robotic device and the force signal, the computing system may improve the accuracy of detecting a touch-down event.

In one example, the computing system of the robotic device may be configured to receive a plurality of force signals due to a given force experienced by a plurality of actuators of the limb of the robotic device. The given force may occur due to an end component of the limb contacting an element in an environment. In this example, the computing system of the robotic device may provide a combined ground force estimate signal based on the combination of the plurality of force signals. Further, the combined ground force estimate signal may be compared to a given threshold by the computing system of the robotic device in order to determine a touch-down event.

At block 1104, the method 1100 includes receiving, at the computing system of the robotic device, an output signal from a sensor of the end component of the limb. The sensor may be configured to determine a pressure or a force in a plurality of ways. In one example, the sensor may be provided at a sole of the end component of limb. The sensor may include a tube of air provided at the sole of the end component and a pressure sensor coupled to the tube of air. The pressure sensor may be configured to determine a magnitude of pressure in the tube and provide the magnitude as the output signal.

In another example, the computing system of the robotic device may receive a second output signal from a strain gauge. The strain gauge may be provided between an end of the limb and the end component of the limb. In one example, the strain gauge may be integrated into the leg in order reduce the overall weight of the robotic device.

By way of example, the computing system of the robotic device may receive the second output signal from a load cell provided on the end component of the limb. The load cell may be configured to sense a magnitude and a direction of force applied to the end component of the limb. In this example, the different force measurements may be combined into a single signal but directionality can also be used to assist in determining the likelihood of a touch-down event.

At block 1106, the method 1100 includes determining, at the computing system of the robotic device, an operational state of the limb of the robotic device. By way of example, the computing system of the robotic device may receive information indicative from a sensor 110 of robotic device 100 that is configured to monitor the gait associated with the robotic device. In another example, the operational state of the limb may be selected from a list of known operational states associated with the gait of the robotic device. For instance, if the robotic device is traversing an environment, then an operational state of the limb may be alternate between lift-off and touch-down. In another example, the operational state may be associated with a fixed position of the limb based on the robotic device not moving. Other operational states may include walking, running, turning, etc. In this example, the information received from the sensor 110 may help to determine if the limb of the robotic device is in contact with an element in the environment.

In one example, the operational state of the limb may be determined through the use of a plurality of gyroscopes coupled to one or more members of the limb. Based on an operation of the robotic device, the one or more members will be positioned at a given angle with respect to one or more joints. The computing system of the robotic device may be configured to determine a given orientation of the one or more members with respect to each other based on data received from the plurality of gyroscopes. The given orientation may be used by the computing system of the robotic device to determine an operational state of the limb.

In another example, the operational state of the limb may be determined according to measured power levels associated with operation of the robotic device. In this example, the robotic device may include a hydraulic system that is used to operate one or more limbs. The computing system of the robotic device may receive sensor data that pertains to the usage of a plurality of pressurized fluids within one or more hydraulic actuators in order to determine the operational state of the limb. For instance, the robotic device may need to select between the plurality of pressurized fluids in a quicker manner when the robotic device is running instead of walking. The time associated with the use and selection of pressurized fluids may be received by the computing system of the robotic device in order to determine if the robotic device is running or walking.

By way of example, one or more accelerometers may be coupled to the one or more limbs of the robotic device. The computing system of the robotic device may be configured to receive data from the one or more accelerometers in order to determine the operational state of a given limb. In this example, the one or more accelerometers may be used to provide information comprising a magnitude and direction associated with the beginning of a lift-off or touch-down event to the computing system of the robotic device.

At block 1108, the method 1100 includes modifying, at the computing system of the robotic device, the force signal based on the operational state of the limb of the robotic device. In one example, the force signal may be modified based on a given orientation of one or more members of the limb with respect to each other. In this example, the computing system of the robotic device may receive information indicative of the given orientation from the actuator force detection unit 302 associated with the touch-down event determination system 300 of FIG. 3. By way of example, the force signal may be modified so that the force signal is below a first threshold in order to prevent a false touch-down event from occurring. In another example, the force signal may be modified to represent a fraction of a determined level of force.

At block 1110, the method 1100 includes determining whether the modified force signal satisfies a first threshold. The first threshold may be predetermined based on the application of the robotic device. In one example, the speed of the robotic device may be taken into consideration when determining the first threshold. In this example, as the robotic device traverses an environment at a quicker speed, the force present during a touch-down event may be higher due to an increase in acceleration. A higher first threshold would be used in this instance compared to another instance when the robotic device is moving at a slower speed. In one instance, the first threshold may be configured to a force of 800 Newtons when the robotic device is moving at a quicker speed. In another instance, the first threshold may be configured to a force of 600 Newtons based on a reduction in speed of the robotic device.

At block 1112, the method 1100 includes determining whether the output signal satisfies a second threshold, wherein the second threshold is lower than the first threshold. The second threshold may be associated with a higher performing sensor such as a pneumatic sensor. By way of example, the second threshold may be configured to a force of 100 Newtons.

By way of example, the computing system of the robotic device may provide a combined output signal based on a combination of the output signal and the second output signal. In this example, the computing system of the robotic device may determine if the combined output signal satisfied a third threshold. The third threshold may be lower than the second threshold.

At block 1114, the method 1100 includes based on at least one of the modified force signal satisfying the first threshold or the output signal satisfying the second threshold, providing by the computing system of the robotic device, a touch-down output indicating touch-down of the end component of the limb with a portion of the environment. In one example, based on a given interaction between the robotic device and the environment, it may be possible to determine a touch-down event from satisfying either the first threshold or second threshold. In one instance, the second threshold may be satisfied due to an unexpected element in the environment such as stepping on a rock. In this instance, the first threshold may not be satisfied due to a smaller force determined based on the given end component making contact with the rock. In this example, it may be possible that the second threshold is satisfied based on a lower threshold associated with the second threshold. Further, determining that the second threshold has been satisfied will enable the robotic device to proceed with a next phase in operation based on a touch-down event and avoid a false negative.

By way of example, the computing system of the robotic device may be configured to determine a touch-down event from satisfying the first threshold and the second threshold. In this example, the computing system of the robotic device may be configured to provide a touch-down output based on the modified force signal satisfying the first threshold and the output signal satisfying the second threshold. By satisfying the first threshold and the second threshold, the robotic device may continue to operate in an effective manner and reduce the number of false positives that may occur while traversing the environment.

In another example, the computing system of the robotic device may be configured to provide a touch-down output indicating touch-down of the end component of the limb with a portion of the environment based on at least one of the modified force signal satisfying the first threshold or the combined output signal satisfying the third threshold. In this example, the use of multiple sensors associated with the combined output signal may help to increase a confidence level associated with a touch-down event.

Further, the method 1100 may also include a manner of determining different states of a touch-down event. In one example, based on the output signal satisfying the second threshold, the method 1100 includes determining an initial touch-down of the end component of the limb with the portion of the environment. Determining an initial touch-down may enable the robotic device to transmit a signal to various other electrical and/or mechanical components in order to prepare for a next procedure associated with the operation of the robotic device. The robotic device may then continue to determine a next state associated with a touch-down event based on the modified force signal satisfying the first threshold. Based on both thresholds satisfied, the computing system of the robotic device will have determined that the end component of the limb is in contact with the portion of the environment.

In another example, the method 1100 may also include receiving, at the computing system of the robotic device, information indicating an estimated distance of the end component of the limb to the portion of the environment and determining one or more of the first threshold and the second threshold based on the estimated distance. This would enable the computing system of the robotic device to continuously update one or more of the first threshold and the second threshold based on the estimated distance. This may be useful as the robotic device is traversing an environment containing a constant change in elevation. The information indicating an estimated distance may also be useful for determining a confidence of the touch-down output based on the estimated distance. The confidence may be indicative of a certainty that the end component of the limb has completed a stage of a gait. In one example, a confidence of certainty may be achieved based on updating either the first threshold or the second threshold as the robotic device is moving down a descending slope of an environment. Updating the first threshold or the second threshold based on an increased distance between the robotic device and the ground will increase accuracy in determining a touch-down event. By way of example, a confidence of certainty based on the increase in accuracy associated with a touch-down event may allow the robotic device to traverse the environment in an efficient manner.

Figure 12:
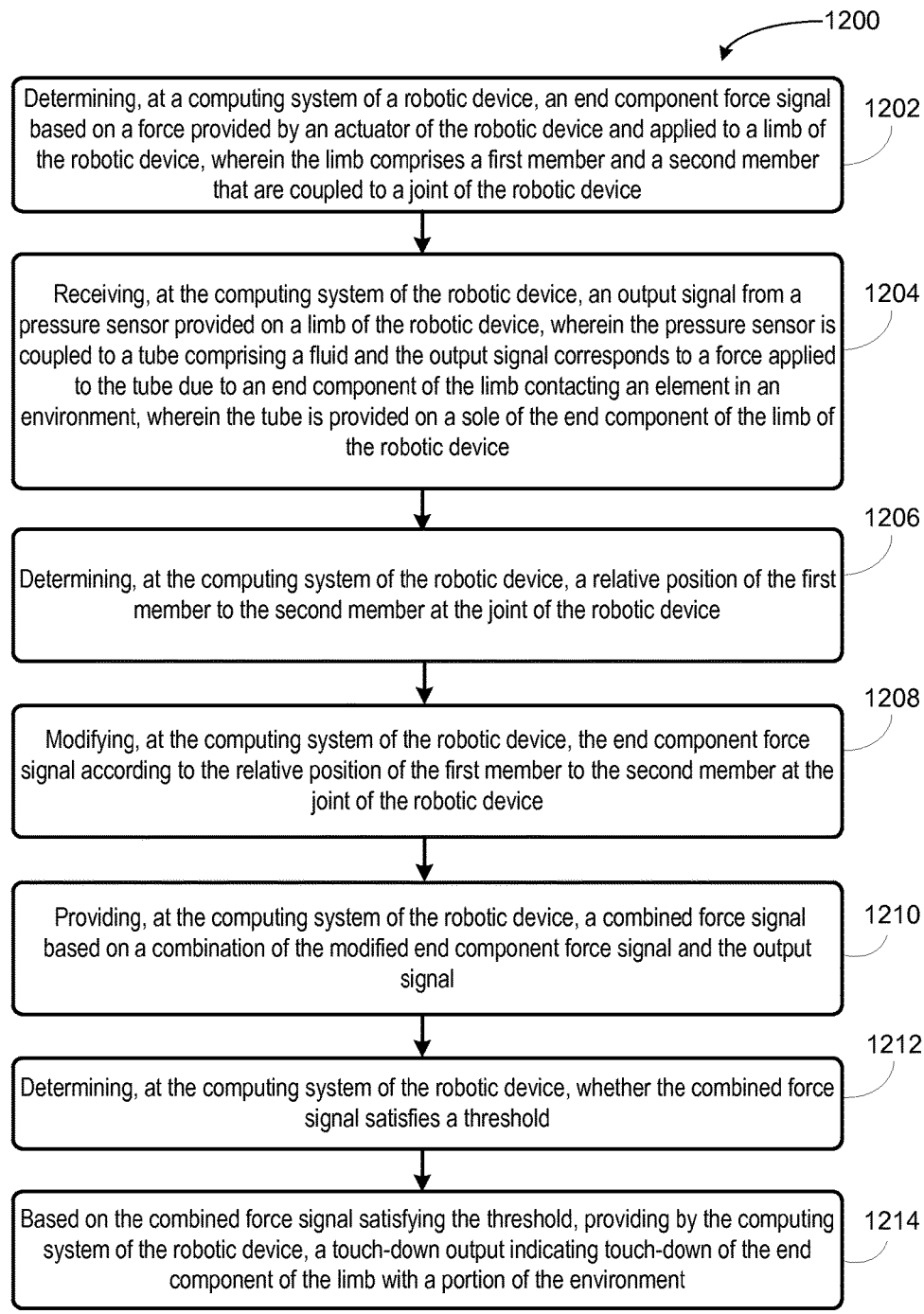
FIG. 12 illustrates a block diagram of another method according to an example embodiment.

FIG. 12 illustrates a block diagram of another method 1200, according to an example embodiment. Method 1200 may include one or more operations, functions, or actions as illustrated by one or more of blocks 1202-1214. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 1202, the method 1200 includes determining, at a computing system of a robotic device, an end component force signal based on a force provided by an actuator of the robotic device and applied to a limb of the robotic device, wherein the limb comprises a first member and a second member that are coupled to a joint of the robotic device. The end component force signal may be determined by using a mathematical transform.

At block 1204, the method 1200 includes receiving, at the computing system of the robotic device, an output signal from a pressure sensor provided on a limb of the robotic device, wherein the pressure sensor is coupled to a tube comprising a fluid and the output signal corresponds to a force applied to the tube due to an end component of the limb contacting an element in an environment, wherein the tube is provided on a sole of the end component of the limb of the robotic device.

In one example, the method 1200 may include determining, at the computing system of the robotic device, a length of time associated with the force applied to the tube. Based on the length of time associated with the force applied to the tube, the computing system of the robotic device may determine whether the length of time is greater than a minimum length of time. The minimum length of time may be determined by a continuous contact between the end component of the limb and the element in the environment. In another example, it may be possible that an object such as a pipe falls and makes contact with the robotic device for a given length of time and then rolls away from the robotic device. In this example, the minimum length of time may help the robotic device in avoiding a false touch-down event based on a given element of the environment making contact with the robotic device for a given length of time that is less than the minimum length of time.

At block 1206, the method 1200 includes determining, at the computing system of the robotic device, a relative position of the first member to the second member at the joint of the robotic device. By way of example, the relative position of the first member to the second member at the joint of the robotic device may be determined according to an angle of the first member and the second member with respect to the one or more joints.

At block 1208, the method 1200 includes modifying, at the computing system of the robotic device, the end component force signal according to the relative position of the first member to the second member at the joint of the robotic device. In one example, the modified force signal may help to reduce the number of false touch-down events from occurring if the first member and the second member of the robotic device enter singularity. In one example, the end component force signal may be modified to represent a null value based on the relative position of the first member to the second member. In another example, the end component force signal may be modified to include a Boolean data type. Other examples of modifying the end component force signal are possible as well.

At block 1210, the method 1200 includes providing, at the computing system of the robotic device, a combined force signal based on a combination of the modified end component force signal and the output signal. In one example, the modified end component force signal and the output signal may be each converted to value based on a given scale before the combination occurs. In another example, the modified end component force signal and the output signal may each be weighted prior to combining in order to place a higher confidence in either signal. In this example, it may be determined that a pressure sensor exhibits a higher degree of accuracy in detecting a touch-down event while the robotic device is traversing an environment with an increasing slope due to an inertial force distorting the end component force signal. By providing more weight on the output signal associated with the pressure sensor, the robotic device may rely more on the output signal to determine a touch-down event.

At block 1212, the method 1200 includes determining, at the computing system of the robotic device, whether the combined force signal satisfies a threshold. The threshold may be adjusted based on feedback from other sensors associated with the robotic device. A camera may be an example sensor that can provide feedback to be used to adjust the threshold.

In one example, the method 1200 may include determining, at the computing system of the robotic device, a distance from the end component of the limb to a plane of the environment associated with a movement of the end component of the limb. Based on the distance detected, updating, at the computing system of the robotic device, the threshold based on the distance. In this example, a camera may be used to determine a detected change in elevation associated with an environment.

At block 1214, the method 1200 includes based on the combined force signal satisfying the threshold, providing by the computing system of the robotic device, a touch-down output indicating touch-down of the end component of the limb with a portion of the environment.

In another example, the method 1200 may include providing, at the computing system of the robotic device, a touch-down stop signal to an actuator coupled to the limb.

The touch-down stop signal may be configured to cause the actuator to maintain a current position of the limb based on contact with a surface of the portion of the environment. The computing system of the robotic device may also be configured to provide a touch-down end signal to the actuator. The touch-down end signal may be configured to cause the actuator to move the limb away from the current position based on a desired operation of the robotic device.

The robotic device may also be configured to perform additional actions while maintaining contact with the surface. In one example, the computing system of the robotic device may receive instructions to continue traversing a given environment until reaching a predetermined destination. In order to maintain a desired gait while traversing the given environment, the computing system may be configured to continuously provide touch-down stop signals and touch-down end signals to various limbs of the robotic device until reaching the predetermined destination based on receipt of multiple touch-down outputs associated with a plurality of limbs.

By way of example, the computing system of the robotic device may include a stance controller. The stance controller may be configured to receive a given touch-down output associated with a given limb of the robotic device. Based on receipt of the touch-down output, the stance controller may be configured to provide a touch-down stop signal to the given limb in order to cause the robotic device to stop moving in a given direction.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, at a computing system of a robotic device, a force signal due to a force experienced at a limb of the robotic device due to an end component of the limb contacting an element in an environment;
   receiving, at the computing system of the robotic device, an output signal from a sensor of the end component of the limb, wherein the sensor is provided at a sole of the end component and the output signal is based on a detected pressure at the sole;
   determining whether the force signal satisfies a first threshold;
   determining whether the output signal satisfies a second threshold, wherein the second threshold is lower than the first threshold; and
   based on at least one of the force signal satisfying the first threshold or the output signal satisfying the second threshold, providing by the computing system of the robotic device, a touch-down output indicating touch-down of the end component of the limb with a portion of the environment.

2. The method of claim 1, wherein the sensor includes a tube of air provided at the sole of the end component and a pressure sensor coupled to the tube of air to determine a magnitude of pressure in the tube as the output signal.

3. The method of claim 1, further comprising:
   receiving, at the computing system of the robotic device, a second output signal from a strain gauge, wherein the strain gauge is provided between an end of the limb and the end component of the limb;
   providing, at the computing system of the robotic device, a combined output signal based on a combination of the output signal and the second output signal;
   determining whether the combined output signal satisfies a third threshold, wherein the third threshold is lower than the second threshold; and
   based on at least one of the force signal satisfying the first threshold or the combined output signal satisfying the third threshold, providing by the computing system of the robotic device, the touch-down output indicating touch-down of the end component of the limb with a portion of the environment.

4. The method of claim 1, further comprising:
   based on the force signal satisfying the first threshold and the output signal satisfying the second threshold, providing by the computing system of the robotic device, the touch-down output indicating touch-down of the end component of the limb with a portion of the environment.

5. The method of claim 1, further comprising:
   based on the output signal satisfying the second threshold, determining an initial touch-down of the end component of the limb with the portion of the environment; and
   based on the force signal satisfying the first threshold, determining that the end component of the limb is in contact with the portion of the environment.

6. The method of claim 1, further comprising:
   receiving information indicating an estimated distance of the end component of the limb to the portion of the environment; and
   determining one or more of the first threshold and the second threshold based on the estimated distance.

7. The method of claim 6, further comprising continuously updating one or more of the first threshold and the second threshold based on the estimated distance.

8. The method of claim 6, further comprising determining a confidence of the touch-down output based on the estimated distance, wherein the confidence is indicative of a certainty that the end component of the limb has completed a stage of a gait.

9. The method of claim 1, wherein the robotic device comprises a biped robotic device.

10. A method comprising:
    determining, at a computing system of a robotic device, an end component force signal based on a force provided by an actuator of the robotic device and applied to a limb of the robotic device, wherein the limb comprises a first member and a second member that are coupled to a joint of the robotic device;
    receiving, at the computing system of the robotic device, an output signal from a pressure sensor provided on the limb of the robotic device, wherein the pressure sensor is coupled to a tube comprising a fluid and the output signal corresponds to a force applied to the tube due to an end component of the limb contacting an element in an environment, wherein the tube is provided on a sole of the end component of the limb of the robotic device;
    providing, at the computing system of the robotic device, a combined force signal based on a combination of the end component force signal and the output signal;
    determining, at the computing system of the robotic device, whether the combined force signal satisfies a threshold; and based on the combined force signal satisfying the threshold, providing by the computing system of the robotic device, a touch-down output indicating touch-down of the end component of the limb with a portion of the environment.

11. The method of claim 10, wherein receiving an output signal from a pressure sensor comprises:
   determining, at the computing system of the robotic device, a length of time associated with the force applied to the tube;
   determining, at the computing system of the robotic device, whether the length of time is greater than a minimum length of time, wherein the minimum length of time is associated with continuous contact between the end component of the limb and the element in the environment.

12. The method of claim 10, wherein determining whether the combined force signal satisfies a threshold comprises:
   determining, at the computing system of the robotic device, a distance from the end component of the limb to a plane of the environment associated with a movement of the end component of the limb;
   updating, at the computing system of the robotic device, the threshold based on the distance.

13. The method of claim 10, further comprising:
   providing, at the computing system of the robotic device, a touch-down stop signal to an actuator coupled to the limb, wherein the touch-down stop signal is configured to cause the actuator to maintain a current position of the limb.

14. A robotic device comprising:
   one or more limbs having a respective end component, wherein the one or more limbs are operated to move the robotic device causing contact of the respective end component with one or more elements of an environment;
   a bladder provided at a sole of the respective end component, wherein the bladder includes air or liquid;
   a sensor coupled to the bladder for determining a pressure of the air or liquid in the bladder;
   a touch-down sensor coupled to the respective end component for determining a force applied on the respective end component; and
   one or more processors receiving an output of the sensor and an output of the touch-down sensor and determining contact with the one or more elements of the environment based on the received outputs.

15. The robotic device of claim 14, further comprising a second sensor for determining a plane of the environment, wherein the second sensor is configured to provide a plane estimation signal to the one or more processors for determining contact with the one or more elements of the environment.

16. The robotic device of claim 15, wherein the second sensor comprises a camera coupled to a motorized mount, wherein the motorized mount is configured to update a field of view of the camera based on a motion signal received from a computing system of the robotic device, wherein the motion signal is indicative of a movement of the respective end component.

17. The robotic device of claim 14, wherein the respective end component further comprises:
   a second bladder provided at the sole of the respective end component and coupled to the sensor, wherein the second bladder includes air or liquid, wherein a pressure of the air or liquid in the second bladder increases based on application of the force above a threshold.

18. The robotic device of claim 14, wherein the respective end component further comprises a foot mount, wherein the foot mount comprises a channel configured for receiving the bladder.

19. The robotic device of claim 14, wherein the touch-down sensor comprises a load cell, wherein the load cell is configured to determine a magnitude and direction of the force applied to the respective end component.

20. The robotic device of claim 14, wherein the touch-down sensor comprises a strain gauge.

* * * * *

UNITED STATES PATENT AND TRADEMARK OFFICE
CERTIFICATE OF CORRECTION

PATENT NO. : 10,220,518 B2  
APPLICATION NO. : 15/296094  
DATED : March 5, 2019  
INVENTOR(S) : Zachary Jackowski et al.

Page 1 of 1

It is certified that error appears in the above-identified patent and that said Letters Patent is hereby corrected as shown below:

In the Specification

Column 1, Line 12, please insert:
-- STATEMENT REGARDING FEDERALLY SPONSORED RESEARCH OR DEVELOPMENT
This invention was made with Government support under contract number W91CRB-11-C-0048 awarded by the United States Army. The Government has certain rights in the invention. --

Signed and Sealed this  
First Day of October, 2019

Andrei Iancu  
*Director of the United States Patent and Trademark Office*